(12) United States Patent
Mohammed et al.

(10) Patent No.: US 12,174,116 B2
(45) Date of Patent: Dec. 24, 2024

(54) OPTICAL SWITCHING AND INFORMATION CODING ON FEMTOSECOND OR SUB-FEMTOSECOND TIME SCALE

(71) Applicant: Arizona Board of Regents on behalf of the University of Arizona, Tucson, AZ (US)

(72) Inventors: Mohammed Tharwat Hassan Mohammed, Tucson, AZ (US); Dandan Hui, Tucson, AZ (US); Husain Alqattan, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 18/557,478

(22) PCT Filed: Apr. 27, 2022

(86) PCT No.: PCT/US2022/026451
§ 371 (c)(1),
(2) Date: Oct. 26, 2023

(87) PCT Pub. No.: WO2022/232217
PCT Pub. Date: Nov. 3, 2022

(65) Prior Publication Data
US 2024/0219301 A1    Jul. 4, 2024

Related U.S. Application Data

(60) Provisional application No. 63/181,518, filed on Apr. 29, 2021.

(51) Int. Cl.
*G01N 21/59* (2006.01)
*G01N 21/55* (2014.01)
*G01N 21/17* (2006.01)

(52) U.S. Cl.
CPC .............. *G01N 21/59* (2013.01); *G01N 21/55* (2013.01); *G01N 2021/1725* (2013.01)

(58) Field of Classification Search
CPC . G01N 21/59; G01N 21/55; G01N 2021/1725
(Continued)

(56) References Cited

U.S. PATENT DOCUMENTS

| 5,786,560 A | 7/1998 | Tatah et al. |
| 2012/0027400 A1* | 2/2012 | Christensen ......... H04B 10/695 398/9 |
| 2019/0283178 A1 | 9/2019 | Mishchik et al. |

FOREIGN PATENT DOCUMENTS

| WO | 2022232210 A1 | 11/2022 |
| WO | 2022232217 A1 | 11/2022 |

OTHER PUBLICATIONS

Alqattan et al., Attosecond Light Field Synthesis, APL Photonics, 2022, 7(4):041301, pp. 1-8.
(Continued)

*Primary Examiner* — Tri T Ton
(74) *Attorney, Agent, or Firm* — Quarles & Brady LLP; Yakov Sidorin

(57) ABSTRACT

Methodology for optical switching and/or coding of information with attosecond time resolution and, in particular, binary encoding of data based on modulation of reflectivity or transmissivity of a target non-electrically-conducting material system in a strong light field.

24 Claims, 10 Drawing Sheets

(58) Field of Classification Search
USPC .......................................................... 356/432
See application file for complete search history.

(56) References Cited

OTHER PUBLICATIONS

Hassan et al., Invited Article: Attosecond Photonics: Synthesis and Control of Light Transients, Review of Scientific Instruments, 2012, 83(11):111301, pp. 1-19.
Hui et al., Attosecond Electron Motion Control in Dielectric, Nature Photonics, 2022, 16(1):33-37.
Nozaki et al., Sub-Femtojoule All-Optical Switching Using a Photonic-Crystal Nanocavity, Nature Photonics, 2010, 4(7):477-483.
Ono et al., Ultrafast and Energy-Efficient All-Optical Switching with Graphene-Loaded Deep-Subwavelength Plasmonic Waveguides, Nature Photonics, 2020, 14(1):37-43.
Yang et al., Femtosecond Optical Polarization Switching Using a Cadmium Oxide-Based Perfect Absorber, Nature Photonics, 2017, 11(6):390-395.
PCT International Search Report and Written Opinion, PCT/US2022/026451, Aug. 16, 2022, 9 pages.

\* cited by examiner

OPTICAL SWITCHING AND INFORMATION CODING ON FEMTOSECOND OR SUB-FEMTOSECOND TIME SCALE

CROSS-REFERENCE TO RELATED APPLICATIONS

This US patent application is a national phase of the International Application No. PCT/US2022/026451 filed on Apr. 27, 2022 and published as WO 2022/232217, which claims priority of and benefit from the U.S. Provisional Patent Application No. 63/181,518 filed on Apr. 29, 2021 The disclosure of each of the above-identified patent documents is incorporated herein by reference.

STATEMENT CONCERNING FEDERALLY SPONSORED RESEARCH AND DEVELOPMENT

This project was funded under grant FA9550-19-1-0025 by the Air Force Office of Scientific Research. The government has certain rights in the invention.

RELATED ART

Modern electronics are founded on switching the electric signal by radio frequency (RF) electromagnetic fields on the nanosecond timescale, limiting the information processing to the gigahertz speed. Recently, optical switches have been developed using terahertz and ultrafast laser pulses to control the electric signal and enhance the switching speed to the picosecond and a few hundred femtoseconds time scale. (See, for example, Nozaki, K. et al. Sub-femtojoule all-optical switching using a photonic-crystal nanocavity. *Nature Photonics* 4, 477-483, 2010; Yang, Y. et al. Femtosecond optical polarization switching using a cadmium oxide-based perfect absorber. *Nature Photonics* 11, 390-395, 2017; Ono, M. et al. Ultrafast and energy-efficient all-optical switching with graphene-loaded deep-subwavelength plasmonic waveguides. *Nature Photonics* 14, 37-43, 2020, to name just a few). Optical switching at an even higher speeds remained beyond reach thus far.

SUMMARY

Embodiments of the invention provide an apparatus that includes an illumination system, a light-collection system, and a microprocessor configured to interpret light output from the light-collection system as a set of codes. The illumination system has an input configured to receive an input beam of light carrying input light pulses and having an input spatial distribution of light, the illumination system being structured to reconfigure such input spatial distribution into spatially-distinct and coherent with one another drive and probe spatial distributions of light, and to direct these drive and probe spatial distributions of light towards a predetermined location to spatially overlap them at a medium present at the predetermined spatial location. A light-collection optical system includes at least an optical detection system (that is disposed to receive only light from the probe distribution of light that has interacted with the medium and to produce an image representing variation of an optical parameter of the medium caused by interaction of the medium with the drive distribution of light). The microprocessor (a programmable electronic circuitry system) is operably (for example, electrically) cooperated with a tangible non-transitory storage medium containing program code thereon. The program code, when loaded to the programmable electronic circuitry, enables the electronic circuitry at least (1) to acquire an output from the light-collection optical system, where such output represents a time-dependent variation of an optical parameter (such as optical reflectivity and/or optical transmissivity) of the medium to being irradiated with the drive distribution of light (optical field, optical beam) only when the medium is also being substantially simultaneously irradiated with the probe distribution of light; and (2) to generate indicia representing at least one of (i) an electrical signal from the medium when the electrical signal exceeds a pre-determined electrical signal threshold and (ii) an optical field when intensity of optical field in the drive distribution of light exceeds a pre-determined optical signal threshold. An embodiment of the apparatus may also include a source of light configured to generate the input beam carrying such input light pulses which have a femtosecond duration or a sub-femtosecond duration. In at least one implementation, (i) the light-collection system may preferably include at least one of a lens and a reflector, as well as an optical detector; and/or (ii) the illumination system may include at least one of a refractive optical component and an optical reflector, and a time-delay relay that is juxtaposed with the an optical system of the illumination system and connected to the electronic circuitry and that is configured to introduce a phase delay between a drive optical field of the drive distribution of light and a probe optical field of the probe distribution of light; and/or (iii) the medium at the predetermined spatial location may include a target substantially non-electrically-conducting material carrying or having first and second electrodes thereon. At least in the latter case, when the medium at the predetermined spatial location includes such target material carrying the first and second electrodes thereon, the programmable electronic circuitry may be additionally configured to acquire an electrical signal (from the first and second electrodes) representing an electrical response of the target material to being irradiated with the drive distribution of light only when the target material is also being substantially simultaneously irradiated with the probe distribution of light. Alternatively or in addition, and substantially in any embodiment of the apparatus, the programmable electronic circuitry may be additionally optionally configured to vary a parameter of the optical field of the drive distribution of light such as to change at least a time delay between occurrences of generation of generated indicia in a predetermined fashion, and/or may be additionally optionally configured to govern the electronic circuitry to perform at least the following actions: (i) to operate a time-delay relay juxtaposed with the illumination system to vary a phase delay between the drive optical field and the probe optical field; (ii) to define the optical signal threshold to be registered with the light-collection system, wherein the optical signal threshold is defined such that the light-collection system generates an indicia of a registered optical signal only when an intensity of an optical field of the probe distribution of light acquired at the light-collection system exceeds the optical signal threshold. Alternatively or in addition, and substantially in every implementation of the apparatus, the light-collection optical system may optionally but preferably include at least one of an optical polarizer component and a spatial filter disposed to block light from the drive optical field from entering a field of view of an optical detection system of the light-collecting system, and/or the light-collection optical system may be configured to acquire light only from the probe distribution of light in reflection from (or in transmission through) the medium. Furthermore, in substantially every embodiment, the illumination system may be configured to include at least one of the following: a) at least one curved optical reflector, and b) an optically-opaque screen with first and second apertures.

Embodiments of the invention additionally provide a method that includes the following steps: a step of receiving the input beam of light at the input of the apparatus according to any embodiment described above; a step of irradiating a target substantially non-electrically-conducting material, disposed at the pre-determined spatial location, with a first pulse of a drive optical field formed from the input beam of light and containing oscillations occurring on a femtosecond time scale or a sub-femtosecond time-scale; a step of illuminating said target material with the second pulse of a probe optical field produced from the input beam of light; and a step of performing, with the programmable electronic circuitry of the apparatus, one or more of the following: a) acquiring at least one electrical signal, from the target material, that represents an electrical response of the target material to interaction with the drive optical field (here, such at least one electrical signal is generated only when said illuminating and said irradiating occur simultaneously); and b) with an optical detector of the light-collecting system, acquiring light of the probe beam that has interacted with the target material to identify a time-dependent distribution of the drive optical field (here, the time-dependent distribution of the drive optical field is identified only when the steps of illumination and irradiating occur substantially simultaneously). The method additionally includes a step of generating indicia of at least one of the following: (i) the at least one electrical signal from the target material when the electrical signal exceeds a pre-determined electrical signal threshold and (ii) the drive optical field when intensity of the probe beam acquired at the optical detector exceeds a pre-determined optical signal threshold. Substantially in every implementation, the method may additionally include (i) interpreting an occurrence of such indicia as one of "0" and "1" of a binary number system; and/or (ii) interpreting a time-delay between neighboring occurrences of such indicia as the other of "0" and "1" of the binary number system. Alternatively or in addition, the step of generating indicia of the at least one electrical signal may include generating an indicia signal in which a time delay between occurrences of said indicia is interpreted by the programmable circuitry of the apparatus as one of "0" and "1" of a binary number system and in which a peak registered above the electrical signal threshold is interpreted as the other of "0" and "1" of the binary number system; and/or the embodiment of the method may additionally contain (1) modifying the drive optical field to have at least one electrical signal include multiple peaks (such that at least first and second peaks from the multiple peaks of the at least one electrical signal exceed the electrical signal threshold; and reconfiguring the drive optical field such as to vary a time delay between the first peak and the second peak; and/or (2) modifying the drive optical field to have irradiance of the drive optical field include multiple peaks (such that at least first and second peaks of the multiple peaks of the irradiance of the drive optical field exceed the pre-determined optical signal threshold, and reconfiguring the drive optical field such as to vary a time delay between the first and second peaks of said multiple peaks of irradiance. At least when the target sample is configured to carry and/or contain electrodes on opposing sides thereof, an embodiment of the method may additionally include—with the use of the electrodes—measuring variations of an electrical parameter caused at the target material at least by the irradiating the target sample with the first pulse of the drive optical field. Alternatively or in addition, and at least in one implementation, the method may include transforming the drive optical field to have irradiance of the drive optical field contain at least first and second peaks above a predetermined threshold of irradiance. (In a specific case of such implementation, the method may be configured to satisfy at least one of the following conditions: the method further comprises varying a time delay between the first and second peaks; and—a ratio of a first duration, of a chosen peak of the first and second peaks of the irradiance of the drive optical field, to a second duration of said time delay is equal to a pre-determined value, and—the method further includes recording a binary code, based at least on an output from an optical detector of the light-collecting system, in which said time delay is interpreted as one of "0 and "1" from a binary number system and in which a peak registered above the predetermined threshold of irradiance is interpreted as the other of "0" and "1" of the binary number system. Furthermore, and in at least one implementation, the at least one electrical signal is received from electrodes carried by a target material located at the predetermined location in space or spatial location, and the method may additionally include a step of transforming the drive optical field to have such at least one electrical signal from the target material contains at least first and second peaks above a pre-determined threshold of electrical signal. (In the latter case, the method may be additionally configured to satisfy at least one of the following requirements: a) the method further includes varying a time delay between the first and second peaks of the electrical signal; and b) a ratio of a first duration, of a chosen peak of the first and second peaks of the electrical signal, to a second duration of said time delay is equal to a pre-determined value while the method further contains a step of recording a binary code, based at least on an output from the programmable electronic circuitry, in which the time delay between the first and second peaks of the electrical signal is interpreted as one of "0 and "1" from a binary number system and in which a peak registered above the pre-determined threshold of electrical signal is interpreted as the other of "0" and "1" of the binary number system. Moreover—in at least one case, the method is necessarily devoid of using a second harmonic of the drive optical field and/or a third harmonic of the drive optical field and/or using a phase-retrieval algorithm, and/or the generated indicia represents the oscillation of optical field and does not represent an envelope of an oscillating optical field.

Understandably, the principle of interpretation of the coding of information expressed above in terms of a binary number system may be applied to a different commonly known system such as octal, hexadecimal, ASCII, and binary-coded decimal (BSD), to name just a few. Each of these implementations remains within the scope of the invention.

Embodiments additionally provide a method that includes:
by changing a mode of operation of a laser source, modifying—on a femtosecond time scale or a sub-femtosecond time scale—a drive optical field, delivered from the laser source to a target sample, to have irradiance including multiple peaks;
acquiring, with an optical detection system, light from a probe optical field in reflection from or in transmission through the target sample, wherein the probe optical field and the drive optical field are substantially coherent with one another,
and
performing at least one of the following actions: (a) interpreting an occurrence when an irradiance of light from the probe optical field acquired at the optical detection system exceeds a pre-determined optical signal threshold as one of "0" and "1" of a binary number system; and (b)
while reconfiguring the drive optical field such as to vary a time delay between the first and second peaks of said multiple peaks of irradiance, interpreting a time delay between consecutive occurrence when the irradiance of light from the probe optical field exceeds the pre-determined optical signal threshold as the other of "0" and "1" of the binary number system. IN at least one specific embodiment of such method a ratio of a first duration (of a chosen peak of the first and second peaks of the irradiance of the drive optical field) to a second duration of the time delay may be equal to a pre-determined value that is defined to have a sequence of occurrences, interpreted as "0" and/or "1", represent a sequence of letters and/or numbers.

BRIEF DESCRIPTION OF THE DRAWINGS

The invention will be more fully understood by referring to the following Detailed Description of Specific Embodiments in conjunction with the Drawings, of which:

FIG. 5A: The measured spectrogram (average three scans) of the reflected probe beam as a function of the time delay between the pump and probe pulses. FIG. 5B: The obtained spectrogram by subtracting the probe spectrum in the absence of pump field from the measured spectrogram (shown in FIG. 5A). The reflectivity switches between maximum to minimum alternatively in 900 attosecond time scale. FIG. 5C, The normalized total reflectivity modulation (TRM) of the $SiO_2$ in the strong field retrieved obtained from the measured spectrogram (in FIG. 5A) by the integration of the probe spectrum at each instance of time. FIG. 5D: The probe beam's spectrum reflected from the $SiO_2$ in the equilibrium state (in the absence of pump field) is shown in line 1. In contrast, reflected spectra intensities of the probe beam (outlined from the spectrogram in FIG. 5A) at τ=0 & 0.9 fs are plotted in lines 2 and 3, respectively.

FIGS. 6A, 6B, 6C, and 16D represent simulated reflectivity dynamics of target sample (fused silica) in a strong light field. FIG. 6A: The retrieved reflectivity behavior of fused silica in strong field extracted from the measured spectrogram (see text) in frequency and time domains. FIG. 6B: The amplitude of the reflectivity oscillation as a function of wavelength is shown in line A calculated by halving the difference between maximum and minimum of an oscillation cycle. The offset is calculated by averaging the maximum and minimum in an oscillation cycle and shown in line B. The transient reflectivity change of $SiO_2$ under no influence of the pump pulse is shown in line C. FIGS. 6C, 6D: The simulation of the measured spectrograms in FIGS. 5A, 5B, respectively, calculated by the developed simple model considering the effect of the spectral phase of the driver pulse as explained in the text.

FIG. 7 shows synthesized waveforms (solid lines in panels AI, BI, CI, DI, &E1), while FIG. 8 presents the respectively corresponding intensity profiles (dashed lines in panels AII, BII, CII, DII, &EII) for control of the electron motion in a dielectric. The calculated number of carrier density $n_{ex}(t)$ triggered by the waveforms of FIG. 7 is plotted—in contrast with the intensity profiles—in solid lines. Using the waveform and intensity profile in panels AI&II, the number of triggered electrons is maximized in one instant of time at the highest field crest (shown in a shaded area under the peak 810 of AII). The full-width-half-maximum or FMHF of temporal profile (that is, of a change in time) of this crest is about 400 attoseconds. The synthesized waveform and intensity profile in panels BI&II triggers the maximum number of electrons at two different time instants (as indicated in shaded red under the peaks 814, 818) separated by about 0.9 femtosecond. This separation time interval is increased to 2.7 fs (between the peaks 822, 826) when the waveform and the intensity profile shown in panels CI&II are used. The highest triggering signals of electrons induced by the synthesized field plotted in panels DI&II occur at three events (represented by peaks 830, 834, 838) separated from one another substantially equally in time by about 0.9 fs. Panels EI&II illustrate a complex measured synthesized waveform and intensity profile that trigger the maximum electron number signal four times (peaks 840, 844, 848, 852). The first two signals (separated from each other by 0.9 fs, peaks 840 and 844) lead the third signal (peak 848) by 3.6 fs. The fourth signal 852 appears after 0.9 fs after the third signal 848. The blue shaded areas 860 in FIG. 8 present a virtual threshold level above the zero value that would be potentially introduced in a dielectric-nanocircuit to switch on/off the light-induced current with attosecond resolution. Potential binary coding signals generated inside this nanocircuit using the presented waveforms is shown in 0 & 1 numbers in FIG. 8.

Figure 1A:
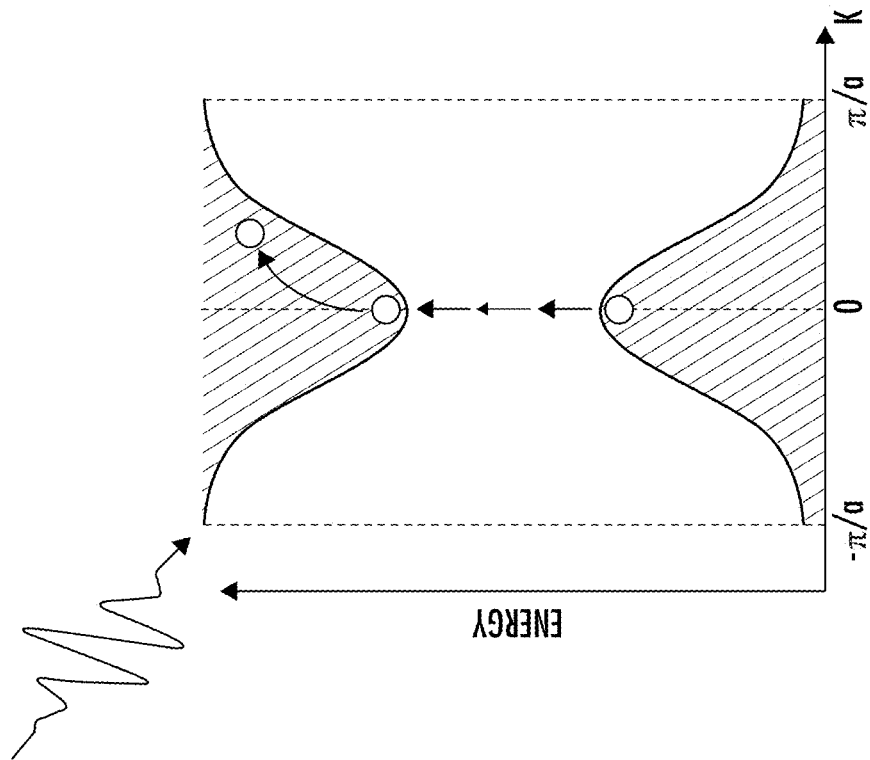
FIGS. 1A and 1B schematically illustrate light-field induced carrier excitation mechanism (FIG. 1A) and the electron motion dynamics (FIG. 1B) in the reciprocal space at the strong and critical strong field strengths, respectively.

Generally, like elements or components in different Drawings may be referenced by like numerals or labels and/or the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

Embodiments of the present invention address the thus far un-solved problem of optical switching on the attosecond scale, and demonstrate the working implementations of a metrology tool based on the attosecond all-optical modulation of reflectivity of a target material (interchangeably referred to as Atto-ARM metrology). Implementations of the present invention stem from the realization that the optical property (such as reflectivity and/or transmissivity) of the non-electrically-conducting material changes in real time following the optical driving field (as a result of change or shift of the wave vector of the electrons in a non-electrically-conducting material at a certain critical strength of such driver field, which causes a semimetal-like transition in the material and the alteration of its dielectric constant). The discussed examples refer to the reflectivity modulation of $SiO_2$ dielectric occurring in strong light field, but it is appreciated that substantially any appropriately configured non-electrically-conducting material (interchangeably referred to herein as a target material, or a target sample, for short) can be used for this purpose. Remarkably, the Atto-ARM measurements also allow to determine the field-induced quasi-bound state lifetime in the target material. Moreover, embodiments of the invention demonstrate the capability of controlling the switching signal with complex synthesized driver fields for data binary encoding. Implementations of the idea of this invention paves the way for establishing optical switches and light-based electronics with peta- and exahertz speeds, several orders of magnitude faster than the current semiconductor-based electronics, thereby opening a new realm in information technology and optical communications.

The application of the Atto-ARM methodology to all-optical switching and coding turns at least in part on the use of an embodiment of the measurement system discussed in International Patent Application PCT/US22/26441, filed on Apr. 27, 2022, the entire disclosure of which is incorporated herein by reference.

Accordingly, the inability of related art to implement all optical-switching on a femtosecond time scale or even a sub-femtosecond time scale has been solved by directly, in real time inducing a phase transition of the target material irradiated with strong driver/pump optical field to produce an optical response exceeding a predetermined threshold, thereby switching between "on" and "off" states of the light signal reflected off of (or transmitted through) such target material. The driver/pump beam is employed as an "encoder beam" to modify the optical properties of the target material, which are thoroughly examined by another, weak probe beam employed as a "decoder beam" that is detected by an optical detection system. After setting certain predefined threshold(s), the photodiode is configured to read the data corresponding to the switching back-and-forth "on" and "off" states substantially as a coded data, in the 1 & 0 binary form. While the discussed below examples of source of light providing the driver and probe light beams utilize the attosecond light field synthesizer (ALFS) source of light (discussed, for example, by M. T. Hassan et al. in *APL Photonics*, 7, 041301; 2022, the disclosure of which is incorporated herein by reference), it will be appreciated by a skilled artisan that the light field encoding can generally be obtained using multicycle optical pulses, which are provided by the commercial laser system in the market, in combination with pulse shaping technology.

For the purposes of this disclosure and accompanying claims, a real time performance of a system is understood as performance which is subject to operational deadlines from a given event to a system's response to that event. For example, a real time use of information representing reflectivity of a given object (such as a piece of material, for example) collected in a buffer or data storage associated with an optical detection system may be one triggered by the user or microprocessor and executed simultaneously with and without interruption of a process of illumination or irradiation of the object during which such information is being or has been acquired and recorded.

As known in related art, the strong ultrafast laser pulses induce phase transition in dielectric material due to strong field interaction. The charge carriers are excited from the valance band to the conduction band in the dielectric via multiphoton excitation through virtual states. Consequently, the target material undergoes an instantaneous phase transition, so the dielectric constant and the optical properties of the system are altered due to the strong polarizability, thereby modulating the reflectivity of the target material according to the evolution of the driver field, thus enabling the control of the material and its optical properties in real-time.

Figure 1B:
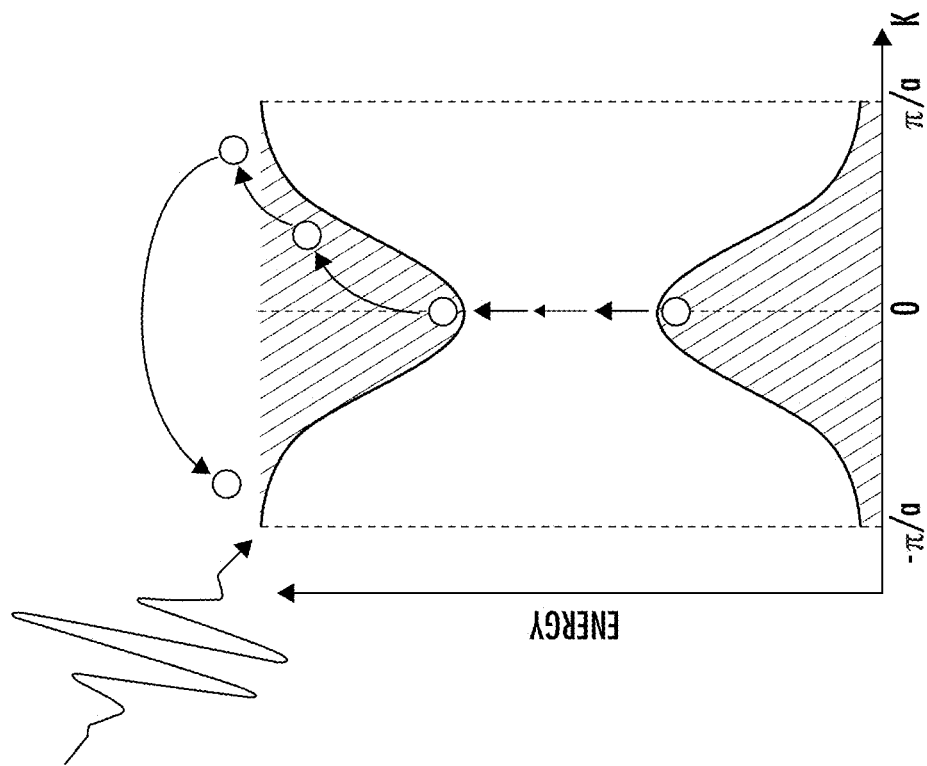

Embodiments of the invention demonstrate the attosecond optical switching with the use of the Atto-ARM approach by exploiting the bouncing of reflectively of a non-electrically-conducting (as shown in the specific but not limiting examples—dielectric) between maximum and minimum on a half field-cycle time scale as schematically illustrated in FIGS. 1A, 1B. Accordingly, the signal represented by light reflected from the target material is switching between ON and OFF with sub-femtosecond resolution. Moreover, using complex synthesized light field waveforms to alter the reflectivity of the dielectric enables to control the switching signal and allows the digital binary encoding with the exahertz speed.

Embodiment(s) of a Measurement System of the Invention

Figure 2:
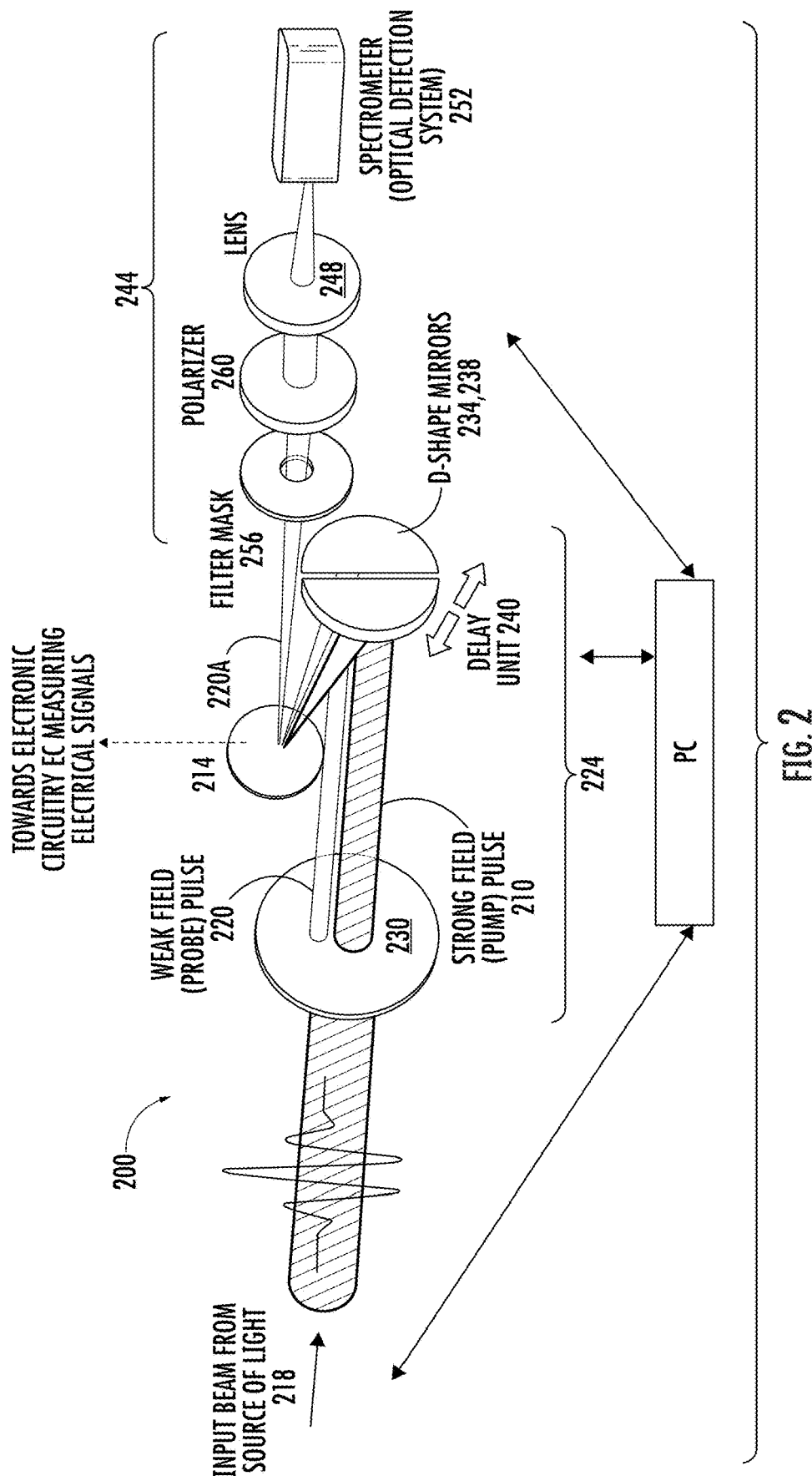
FIG. 2 is a schematic of a system configured to induce and measure the delay response of an electron and all-optical field sampling of such response. The main beam is split by a mask into two strong (interchangeably referred to as pump, or drive) and weak (interchangeably referred to as probe) optical beams, each having a corresponding distribution of optical field. The two beams are focused on a very thin (for example, a 100 micron thin) non-electrically-conducting (in one specific case—dielectric, for example $SiO_2$ based) substrate. One of these D-shape mirrors is connected to a piezo-stage to control the relative delay between the pump and probe pulses with attosecond resolution. The reflectivity modulation of the reflected probe beam spectrum from the substrate is measured with the use of an optical detection system (as shown—an optical spectrometer). A polarizer and a one-hole mask are introduced in the probe beam path before the optical detection system to enhance the signal-to-noise ratio of the reflectivity modulation's measurements.

To instigate the desired modulation of reflectivity of the target material, in one implementation the system 200, schematically illustrated in FIG. 2, a laser source configured to generate light pulses (carried by optical beam 218) of femtosecond or even sub-femtosecond duration was coupled into an input of the system 200. These employed to induce the electronic delay response with the drive (or pump) optical beam or optical field 210 in a target material 214 (shown in this specific non-limiting example as a dielectric $SiO_2$ substrate with thickness of about 100 microns). The registration of such electronic delay response was then carried out by measuring, at the optical detection system 252, the time-resolved modulation of reflectivity of the target material with the probe optical beam or optical field 220. Additional operational parameters of the drive and probe beams utilized in experiments are recited in PCT/US22/26441 filed on Apr. 27, 2022. (Understandably, the same measurement can be alternatively or in addition carried out in transmission of light through the target sample 214.)

Figure 9:
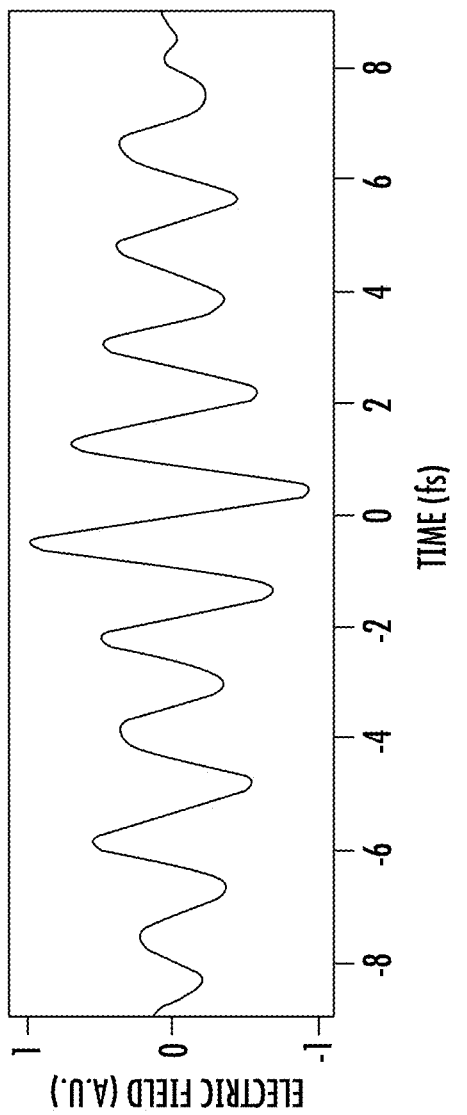
FIG. 9: The electrical component of driver/pump optical field retrieved from the TRM trace (shown in FIG. 5C) used to induces the phase transition and the reflectivity modulation shown in FIG. 5A This field has been also used in the simulation presented in FIGS. 6C, 6D.

In further reference to FIG. 2, in one specific case the laser source providing the input beam (a pulsed light waveform) 218 was configured as the attosecond light field synthesizer ALFS (schematically illustrated in FIG. 9A, see section on Supplementary Information below). Light pulses generated by the ALFS and having a broad-band spectrum were used as the input beam 218 to modify the reflectivity (and/or, in a related embodiment—the transmissivity) of the target sample 214 disposed at the pre-determined location in space or spatial location to which the drive/pump beam 210 and the probe beam 220 were focused. (In one specific case, the nominal carrier wavelength of the such pulsed waveform 218 was about 550 nm, with the pulse duration of about 2.7 fs.) Specifically, in one implementation, a pulse containing multiple cycles of optical field (15 fs) carried at a central wavelength of 800 nm was focused on the facet of and propagated through a Hollow-Core-Fiber (HCF) to generate a broadband spectrum that spanned from Ultra-Violet (UV) to Near-Infrared (NIR) spectral regions. This supercontinuum was further divided into three spectral channels and compressed inside the ALFS apparatus. At the exit of ALFS apparatus, light outputs from the ALFS channels were superimposed to generate a synthesized waveform of 2.7 fs pulse. The relative delays and intensities of the optical fields of the channels of the ALFS were judiciously controlled to synthesize the generated waveform on demand. The carrier-envelope-phase of the synthesized waveform was passively locked (the laser source is OPCPA based). Furthermore, the relative phases between the pulses at the outputs of the ALFS channels were actively locked to ensure the light waveform stability during the experiment.

The beam 218 of pulsed light generated at the output from the ALFS with pulses carrying few-cycles of optical field delivered from the source of laser light (not shown in FIG. 2) was transmitted towards the target non-electrically-conducting sample 214 (in one embodiment—a dielectric or semiconductor sample; in a specific case considered in FIG. 2—a thin substrate of silica, $SiO_2$) through the illumination system 224. In that, the input beam 218, having a spatial distribution of light referred to as input spatial distribution of light, was split into two beams 210, 220 representing mutually-coherent optical fields (the drive field having a drive spatial distribution of light and the probe field having a probe spatial distribution of light, of the drive beam and the probe beam, respectively). As shown, such spatial splitting was achieved by passing the beam 218 through a field-divider component 230; here—a two-hole mask 230 designed to have two holes or apertures of different diameters (in one example—3 mm and 1 mm diameters) in an otherwise optically-opaque screen. (In a related example, a non-equal cube-based beam splitter may be used.) The two mutually-coherent optical fields represented by the drive beam (spatial light distribution) 210 and the probe beam (spatial light distribution) 220 emerge from such field-divider component with different intensities.

In one specific case, the drive or pump beam 210 had a level of intensity sufficiently high (with estimated field strength of about 1 V/A) to be able to induce the phase transition and alter the reflectivity of the substrate 214 (but substantially lower than the damage threshold of the target material 214). The second beam 220 (the probe beam) has intensity even lower (estimated ≤0.1 V/A) than the threshold field strength needed to induce any degree of phase transition in the target sample 214, to ensure that the probe beam does not include any reflectivity change of the target sample 214. The two optical beams 210, 220 were spatially-independently focused onto the sample 214 with respectively-corresponding focusing reflectors 234, 238 (f=100 mm each; shown here as D-shaped mirrors each dimensioned to intersect only a respectively corresponding beam of the pump and probe beams) while being propagated towards and impinged onto the sample 214 at incident angles <5°. (It is appreciated that, more generally, either a refractive or a reflective optical component can be used to direct the beams 210, 220 onto the sample 214 while changing a degree of spatial divergence of at least one of these beans such that the areas irradiated with these beams substantially—if not completely—overlap with one another). At least one of the light focusing components 234, 238 was attached to a piezo-stage (optionally including nanopositioner(s), as known in related art) forming a high-resolution (nanometer) time-relay element 240 to control the delay of a wavefront of one of the drive and probe fields with respect to another with at least femtosecond (and, in a related implementation, with attosecond) resolution.

It is understood that, while the collection of light that has interacted with the target material 214 can generally be performed in transmission through or in reflection from the sample 214, the example of implementation discussed in reference to FIG. 2 was chosen to operate in reflection. Here, only the optical field of the probe beam 220 was collected by the light-collecting optical system 244 after the probe beam 220 has interacted with a portion of the sample 214 (which, generally preferably, was simultaneously irradiated with the drive optical field of the beam 210. Such reflected probe beam 220A, reflected off of the target sample 214, was collected by the light-collecting optical system 244 (which is configured to collect and register light from the probe beam and the drive beam and is shown in the example of FIG. 2 as including a filter mask or spatial filter 256, a polarizer 2650, a lens 248, and an optical detection system— such as a spectrometer—containing an optical detector) and focused by the light focusing system (shown as a lens) 248 and recorded with the optical detection system 252 (shown here to include an optical spectrometer) as a function of the time delay between the pump and probe pulses with a delay step increment of 100 attoseconds.

To ensure that no light from the pump/drive beam 210 that has interacted with the target material 214 reaches the optical detection system 253, the spatial filter 256 may optionally be employed—such as a light-locking screen with an aperture, for example. A light polarizer 256 could be additionally or in the alternative positioned before the optical detection system 252 and a one-opening-containing mask 256 to further filter out the light from the pump/drive beam 210 that has interacted with the sample 214 and to enhance the signal-to-noise ratio in the measurements of the spectral modulation of the optical field carried by the beam 220A.

Preferably programmable electronic circuitry such as a microprocessor or a computer processor (shown in FIG. 2 schematically as "PC") equipped with non-transitory tangible storage medium containing appropriately configured program code(s) was operably cooperated with the system 200 to govern the operation of at least the source of light, the illumination system, the nanopositioner(s) and other electro/mechanical portions of the system, as well as the process of acquisition of images at the optical detection system 252.

In at least one specific embodiment, the target sample 214 may also be equipped with two electrodes (now shown in FIG. 2; electrically-conducted members; for example, the thin silica substrate 214 was sandwiched between such electrodes) that are further electrically connected to the appropriate electronic circuitry EC configured to register modulation of an electrical parameter (for example, electrical charge, current) associated with the target sample 214 as a results of irradiation of the sample 214 with the drive/pump optical beam. The electronic circuitry of the apparatus, therefore, is capable of registering both the optical signal from the detection system 252 and the electrical signal from the electrically-conducting members juxtaposed with the sample 214.

A skilled artisan having advantage of this disclosure will readily appreciate that an embodiment of the apparatus of the invention includes an illumination system (that has an input configured to receive an input beam of light carrying input light pulses and having an input spatial distribution of light, the illumination system being structured to reconfigure the input spatial distribution into spatially-distinct and coherent with one another drive and probe spatial distributions of light, and to direct such drive and probe spatial distributions of light towards a predetermined location to spatially overlap at a medium present at the predetermined location space or spatial location). The apparatus also includes a light-collection optical system that contains at least an optical detection system disposed to receive only light from the probe distribution of light that has interacted with the medium and to produce an image representing variation of an optical parameter of the medium caused by interaction of the medium with the drive distribution of light. Embodiment of the apparatus additionally includes a programmable electronic circuitry system (configured, for example, as a microprocessor) that is cooperated with a tangible non-transitory storage medium containing program code. The program code, when loaded to the programmable electronic circuitry, enables the electronic circuitry to acquire an output from the light-collection optical system, said output representing a time-dependent variation of an optical parameter of the medium to being irradiated with the drive distribution of light only when the medium is also being substantially simultaneously irradiated with the probe distribution of light; and to generate indicia of acquisition of at least one of (i) an electrical signal from the medium when the electrical signal exceeds a pre-determined electrical signal threshold and (ii) an optical field when intensity of optical field in the drive distribution of light exceeds a pre-determined optical signal threshold.

Embodiments of Operation

Figure 4:
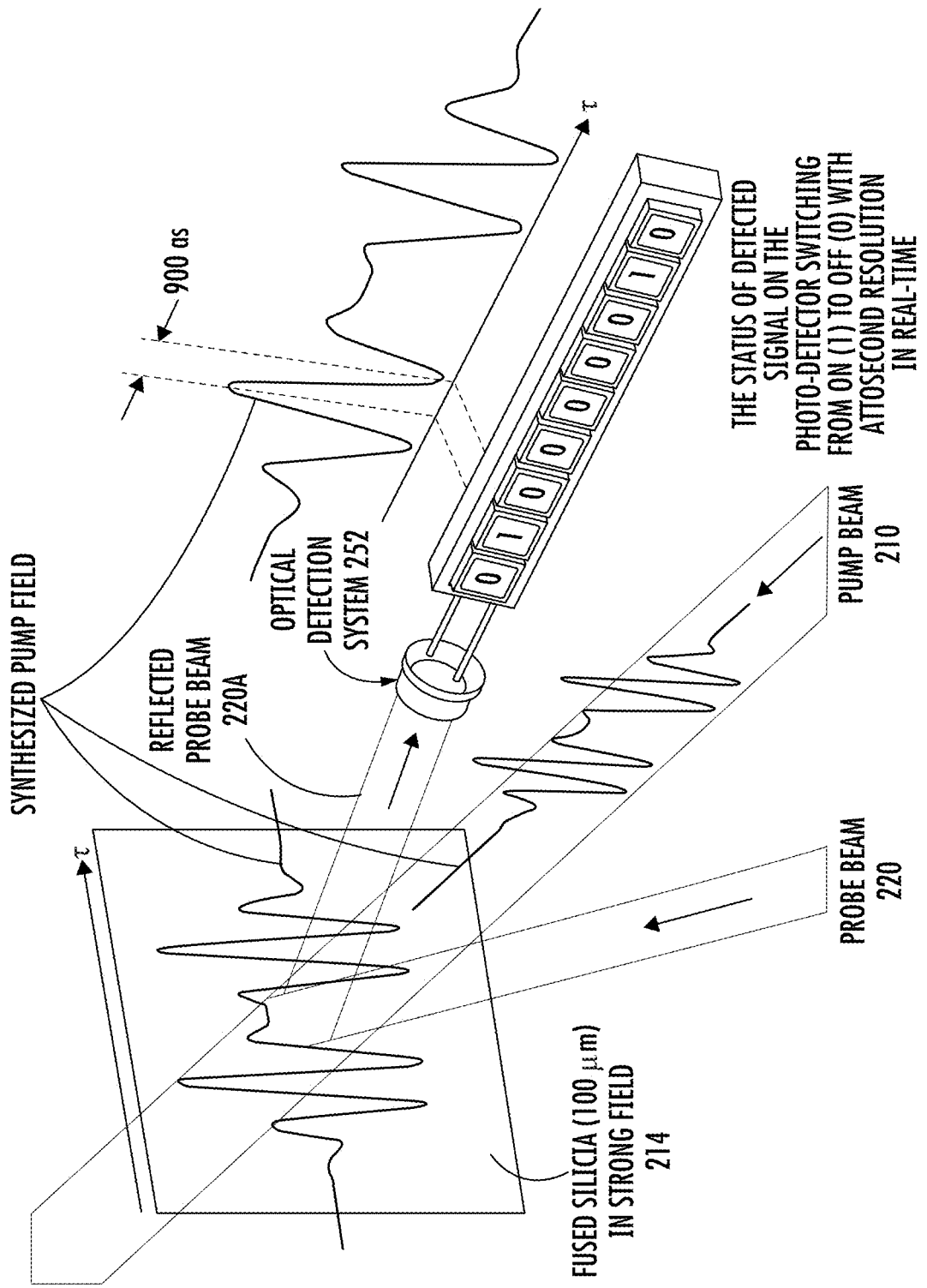
FIG. 4 schematically illustrates the basic principle of the attosecond optical switching based on strong field interaction with dielectric. Light of the pump or drive beam induces the instantaneous phase transition in the generally non-electrically-conducting material (in one case—dielectric, in a specific case—fused silica) system and causes the change in the reflectivity of the such material system following the shape of the optical waveform of the pulse carried by the incident pump or drive beam in real-time. The reflectivity modification is detected by measuring the reflected probe beam's change using a photodetector (e.g., photodiode) as a function of the time delay between pump and probe beams. The detected reflected signal is switched OFF/ON (presented by 0/1), depending on the field intensity at the time r, in real-time. The switching resolution is equal to the duration of the half-cycle field (900 attoseconds) of the pump pulse and can be controlled by tailoring the pump field waveform using the attosecond light field synthesis approach. The attosecond optical switching and control allow to encode data on ultrafast laser pulse and open the door for establishing the ultrafast optical switches.

The spectrum of the reflected light 220A of the probe beam was recorded as a function of the time delay between the drive/pump and probe pulses, see the schematic of FIG. 4.

Figure 5A:
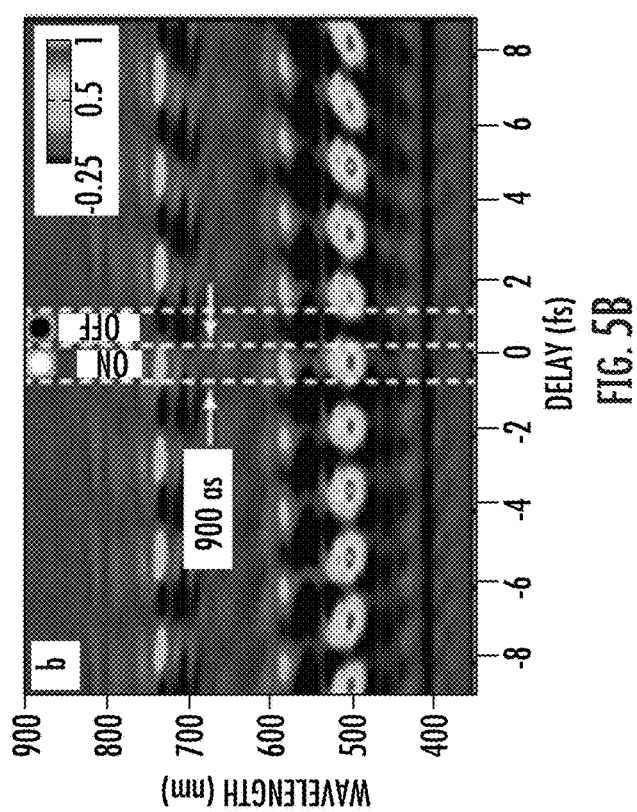
FIGS. 5A, 5B, 5C, and 5D address embodiment(s) of attosecond optical switching. The reflectivity of target sample 214 (in one example—$SiO_2$) is modulated in real-time due to the interaction with a strong (pump) light field.
Figure 5B:
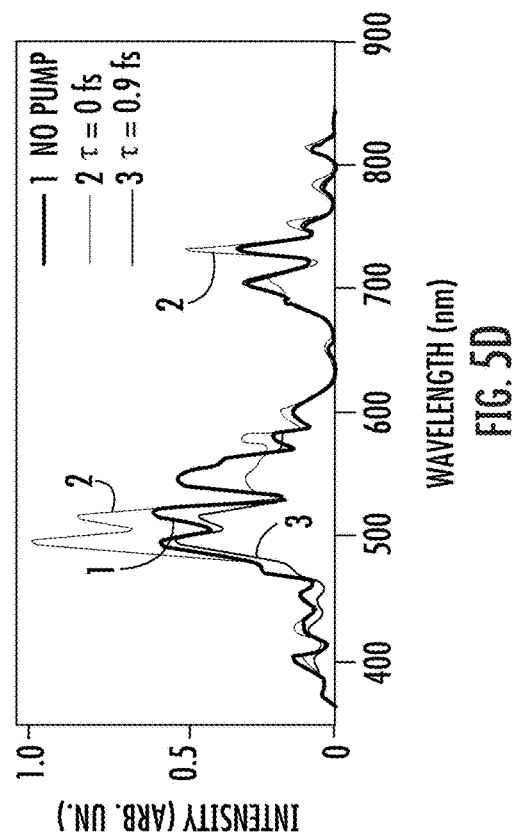

The measured spectrogram (average of three scans, in one example), depicted in FIG. 5A, illustrates the real-time change of the spectrum of light of the probe beam 220 reflected off the front surface of the target sample 214. The temporal modulation (that is, modulation in time) of reflectivity of the sample 214 is distinctly observed, as shown in the spectrogram of FIG. 5B, by subtracting the spectrum of the reflected probe beam 220A in the absence of the driver optical field (which correspond to line 1 in FIG. 5D). The reflectivity of the sample 214 was shown to switch from maximum (ON) to a minimum (OFF) on the sub-femtosecond (900 as) time scale. Generally, the reflectivity modulation is frequency and time dependent. Since the integration of the modulation oscillation over the entire spectrum could be used to obtain the vector potential of the driver field 210 (see Dandan, H. et al. Attosecond electron motion control in dielectric, *Nature Photonics* 16, 33-37 (2021), the profile of the electric field can be retrieved from the measured spectrogram in FIG. 5A by calculating the total reflectivity modulation.

The integration of the measured spectra amplitudes as a function of time delay—a total reflectivity modulation (TRM) trace or image (FIG. 5C)—gives an access to the vector potential, and the driver field.

Figure 5C:
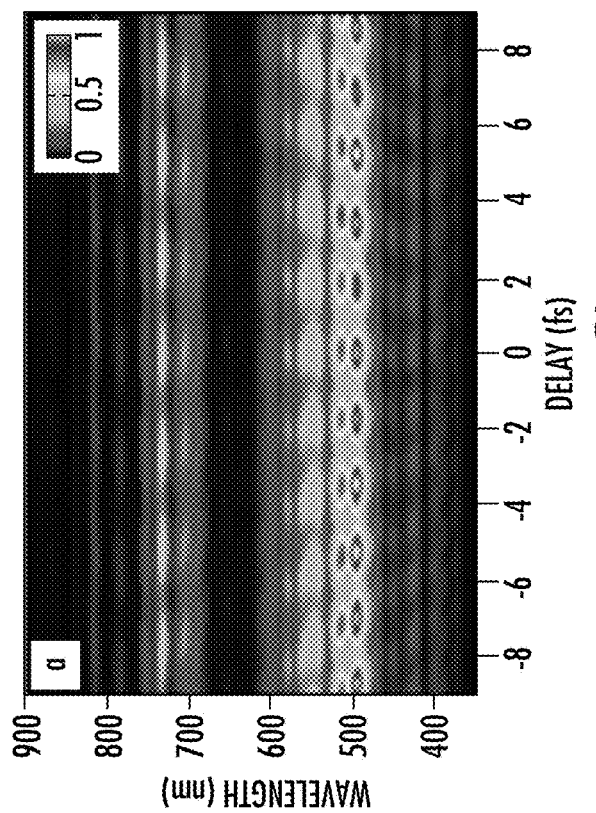
Figure 5D:
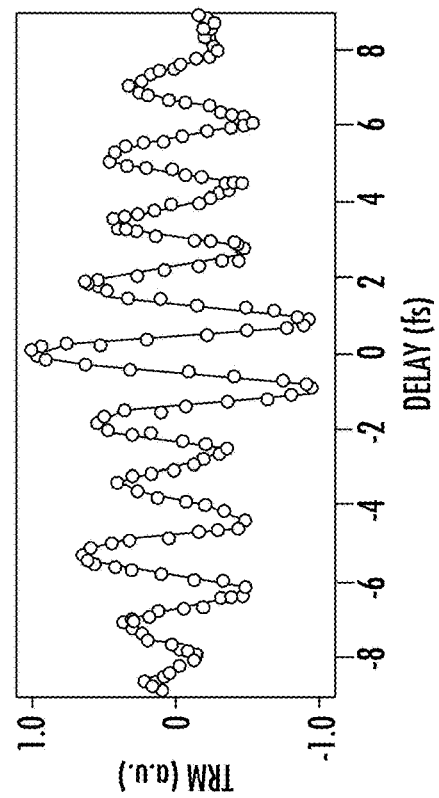

In further reference to FIGS. 5A, 5B, 5C, and 5D, at $\tau=0$ fs, the target sample 214 experiences a phase transition, and its reflectivity increases by ~25% (reflected spectrum of the probe beam, in this case, is shown in line 2 in FIG. 5D) with respect to the reflectivity of the same target sample in the equilibrium state (reflected spectrum with no field effect shown as line 1 in FIG. 5D). In contrast, at $\tau=0.9$ fs, the reflectivity reduces by ~21% (line 3 in FIG. 5D). Hence, the reflectivity changes by a total value of ~45% in a half-cycle time scale representing the switching intensity resolution. Moreover, the measured reflected spectra in FIG. 5D show that the strong field-induced phase transition of the target sample (here—fused silica) is reversible following the driver field oscillations direction.

Figure 6A:
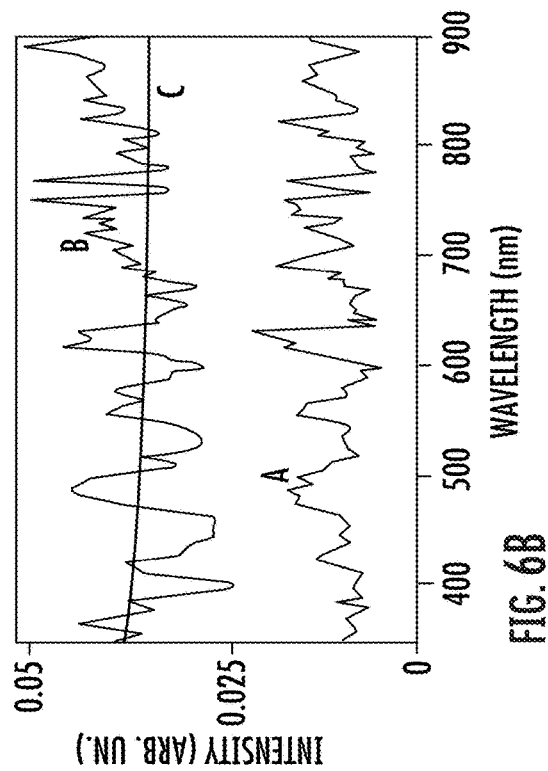

The ultrafast reflectivity switching presented in FIG. 5C is due to the not used thus far in related art ultrafast modification of the target material sample controlled by intense synthesized light field in real-time. The first step for proving and understanding the underlying physics of the frequency-dependent reflectivity switching in real time is to extract the material reflectivity that is modulated due to the strong light field interaction. This can be obtained by dividing the reflected probe pulse spectrum (curve 1 in FIG. 5D) by the intrinsic reflectivity of the material of the target sample 214 (here, fused silica), then deconvolute the result from the measured spectrogram in FIG. 5A. The obtained spectrogram, plotted in FIG. 6A, represents the transient reflectivity change of the fused silica material induced by the strong field of the driver pulse in frequency and time domains. This transient material modification (FIGS. 5A, 5B) happens in a frequency range far from its higher harmonics spectral range, indicating that the observed reflectivity modulation (in FIGS. 5A, 5B) is not a result of the spectral interference between the high harmonic generation frequencies.

Figure 6B:
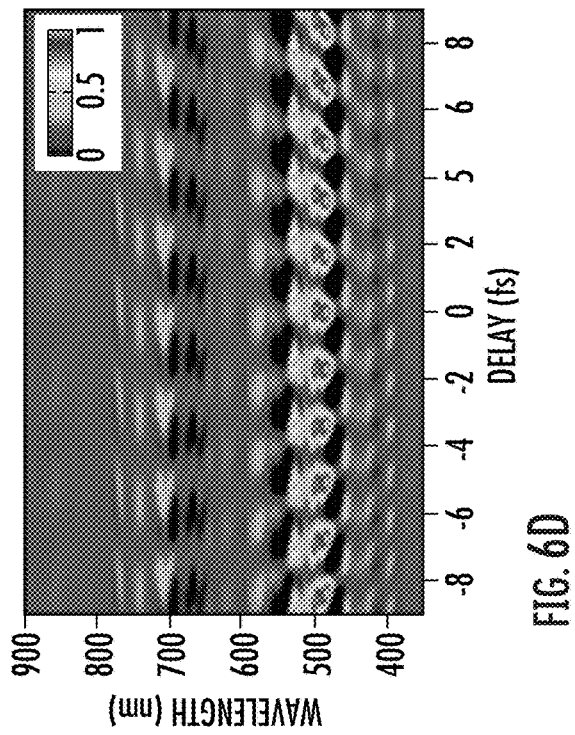

From FIG. 6A, we extracted the average amplitude of the reflectivity oscillation at different frequencies and plotted it with line A in FIG. 6B. The offset values of the reflectivity modulation as a function of frequency are plotted with curve B. Each value at a particular frequency corresponds to the offset from zero point of the temporal oscillation (that is, oscillation in time), whereas the amplitude values determine how strong the reflectivity oscillations will be as a function of pump-probe time delay for that specific frequency. In addition, the reflectivity of fused silica in the equilibrium state (no influence of the pump pulse) is plotted as line C. Comparing the frequency oscillation (FIG. 6B) to the spectrum of pump pulse in FIG. 5D (line 1), a skilled person can observe that the reflectivity peaks do not overlap with the spectrum intensity peaks of the pump pulse, proving that the observed reflectivity modulations seen in our experiment are not due to the interference between the probe and pump pulses. Furthermore, the observed reflectivity oscillations (FIGS. 5A, 5B and FIG. 6A) at any particular frequency are distinct and have steady amplitudes within a time delay range much longer than the pulse's coherence time, indicating that again this modulation is not induced due to the conventional interference between the pump and probe pulses.

Moreover, it is clear in FIGS. 5A, 5B, and FIG. 6A that for each frequency the reflectivity of the target sample 214 is oscillating substantially periodically with a period time associated with that frequency. Also, the oscillation amplitude is controlled by the proximity to an individual resonance frequency in the excited dielectric permittivity induced by the intense pump field. Thus, such ultrafast reflectivity switching can be explained by the interference of the bound-electron resonances, which causes a transient modification of the fused silica dielectric constant ($\epsilon$), refractive index, and its reflectivity in the strong field.

The reflectivity modulation of the dielectric system in a strong field can be expressed as $$R_m(\omega) = \frac{[1-n(\omega)]^2 + \kappa^2(\omega)}{[1+n(\omega)]^2 + \kappa^2(\omega)} \quad (1)$$

where $\tilde{n} = \pm\sqrt{\tilde{\epsilon}_r} = n(\omega) + i\kappa(\omega)$ is the refractive index, $\tilde{\epsilon}_r$ is the relative permittivity. For a particular frequency wo, the electric fields of pump and probe pulses in the time domain can be expressed as $$E_{pump} = A_0 e^{i\omega_0 t} \quad (2)$$

$$E_{pro} = A_1 e^{i\omega_0(t+N\Delta t)} \quad (3)$$

where $A_0$ and $A_1$ are the electric field amplitudes of the pump and probe pulses, respectively. In our experiment $A = A_0/A_1 \sim 10$. $\Delta t$ is the time delay step (100 as), $N\Delta t$ denotes the $N^{th}$ delay step.

After Fourier transformation, we can write Eqs. (2) and (3) in the spectral domain as $$\tilde{E}_{pump} = A_0 \delta(\omega - \omega_0) \quad (4)$$

$$\tilde{E}_{pro} = A_1 \delta(\omega - \omega_0) e^{i\omega N\Delta t} \quad (5)$$

and, $$\frac{\tilde{E}_{pump}}{\tilde{E}_{pro}} = A e^{-i\omega N\Delta t}. \quad (6)$$

Assuming that the material polarizability, modified by the strong field interaction, affects the propagation of the probe pulse, so the electric field of the probe pulse can be expressed as $$\nabla \tilde{E}_{pro} = -\omega^2 \mu_0 (\epsilon_0 \tilde{E}_{pro} + \tilde{P}_{pump} + \tilde{P}_{pro}) = \quad (7)$$

$$-\omega^2 \mu_0 \epsilon_0 \tilde{E}_{pro}(1 + \chi_1' + \chi_2') = -\omega^2 \mu_0 \epsilon_0 \tilde{\epsilon}_r \tilde{E}_{pro},$$

where $$\tilde{\epsilon}_r = 1 + \chi_1' + \chi_2' \quad (8)$$

$$\chi_1' = A e^{-i\omega N\Delta t} \omega_p^2 \sum\nolimits_{k=1,2,\ldots} \frac{f_k}{\omega_{0,k}^2 - \omega^2 - i\omega \Gamma_k} \quad (9)$$

$$\chi_2' = \omega_p^2 \sum\nolimits_{j=1,2,\ldots} \frac{f_j}{\omega_{0,j}^2 - \omega^2 - i\omega \Gamma_j} + C, \quad (12)$$

where $\mu_0$ and $\epsilon_0$ are the permeability and permittivity in vacuum. $\tilde{P}_{pump}$ is the pump-induced material polarization coupled to $\tilde{P}_{pro}$, whereas the latter is the material polarization caused by the probe pulse (note, the intensity of the probe pulse is too weak to induce polarizability change in the system). Eqs. (9) and (10) show that the susceptibility $\chi_1'$ (or $\chi_2'$) corresponding to $\tilde{P}_{pump}$ (or $\tilde{P}_{prop}$) can be expressed as a combination of multiple Lorentz resonators upon the pump excitation, where $\omega_{0,j}$, $\Gamma_j$, and $f_j$ (or $\omega_{0,k}$, $\Gamma_k$, and $f_k$) are the natural frequency, damping rate, and strength of the $j^{th}$ ($k^{th}$) resonator. C is a constant that represents the effect of resonances far from the spectrum range of interest.

$$\omega_p^2 = \frac{e^2 n_e}{m \varepsilon_0}$$

is the square of the plasma frequency, m is the free electron mass. Here, we assume one active electron per molecule in the fused silica, $n_e = 2.2 \times 10^{28}$ m$^{-3}$.

Figure 6C:
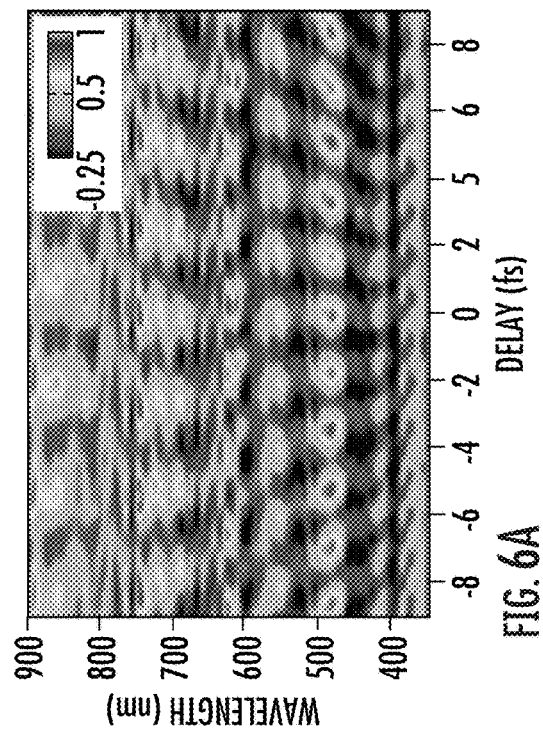
Figure 6D:
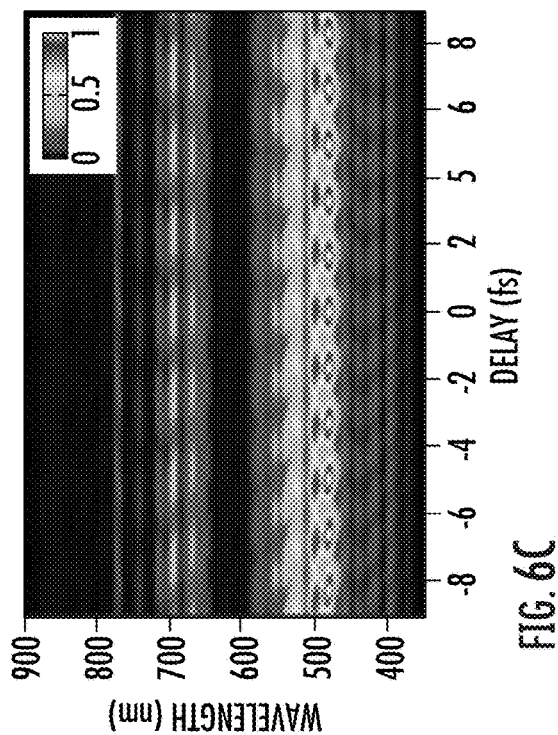

Accordingly, Eqs. (9) and (10) were utilized to simulate the experimentally measured reflectivity modulation spectrogram of fused silica (shown in FIG. 5A) using the pulsed pump/drive optical field shown in FIG. 9. The simulation results of the measured spectrograms (FIGS. 5A, 5B) can capture all the measured reflectivity modulation features, as shown in FIGS. 6C, 6D, respectively, by considering the spectral phase of the pump pulse, as explained in the Supplementary Information. The obtained calculated spectrograms, shown in FIGS. 6C, 6D are in good agreement (Standard deviation=1.37% and 2.1%) with the measured spectrogram in FIGS. 5A, 5B. The fitting parameters for $\chi_2'$ and $\chi_1'$, are listed in Table 1 and Table 2 (see Supplementary Information).

Based on the experiment and theoretical results, the observed ultrafast reflectivity switching of target sample material can be attributed to the multiphoton resonances in the dielectric permittivity of the fused silica excited by the unique high-intensity and broadband near-single-cycle pump pulse. The novelty of the utilized pump pulse manifests in that it has strong field strength to induce the multiphoton excitation without damaging the fused silica system since it contains only 1.5 optical field cycles. Moreover, the employed pump/drive pulse spanned over 1.5 octaves, thereby allowing for multiphoton excitation of fused silica with different photon combinations from the UV, Visible, and NIR spectral regions. Also, the short pulse duration of the pump pulse (2.7 fs) implies that all the photons in the pump pulse are almost in phase, which is a key for inducing the reflectivity switching in the sub-femtosecond time scale. Notably, the weak intensity optical pulse (at the same level as our probe pulse intensity) will not induce the multiphoton excitation, thus no temporally oscillation or reflectivity modulation would be observed.

Additionally, as a skilled artisan will readily appreciate, the presented reflectivity modulation spectrograms in FIGS. 5A, 5B carries the signature of the spectral dispersion of the broadband pump/drive pulsed optical field. Therefore, the presented methodology can be utilized for characterizing the ultrashort laser pulses and its spectral phase dispersion directly and with a high resolution (see PCT/US22/26441 filed on Apr. 27, 2022), which is beyond the capability of the typical ultrashort pulse characterization techniques (i.e., frequency-resolved optical gating) of related art. Moreover, this transient modification can be engineered by controlling the laser pulse waveform (spectral phase) to achieve a tunable refractive index of natural material (i.e., fused silica) by high intensity ultrashort lasers, which is only possible in metamaterials, opening the door for a vast range of applications in ultrafast photonics.

Embodiments of Ultrafast Encoding.

As demonstrated above, the light-induced transition of the target sample allows for switching between ON and OFF states of the reflected light signal following the drier field. A skilled artisan having the advantage of the presented results will now readily appreciate that the light-field-induced electron motion in a non-electrically conducting material (such as a dielectric, for example) can be substantially controlled on-demand by tailoring the shape of the driver (pump) field with attosecond resolution.

To implement such control, a few complex waveforms of the optical field 218 at the input of the measurement system 200 by changing relative phases and/or intensities of the optical fields in the four channels of the source of light (the ALFS 900) to control the electron motion in the target medium (the SiO$_2$ sample 214, in this example). The influence of some of these complex synthesized waveforms of the pump optical field on the target material was then measured by tracing or imaging the modulation of reflectivity of the target sample altered via the electron dynamics (driven by such synthesized fields). The measurements were carried out according to methodology described above.

Figure 7:
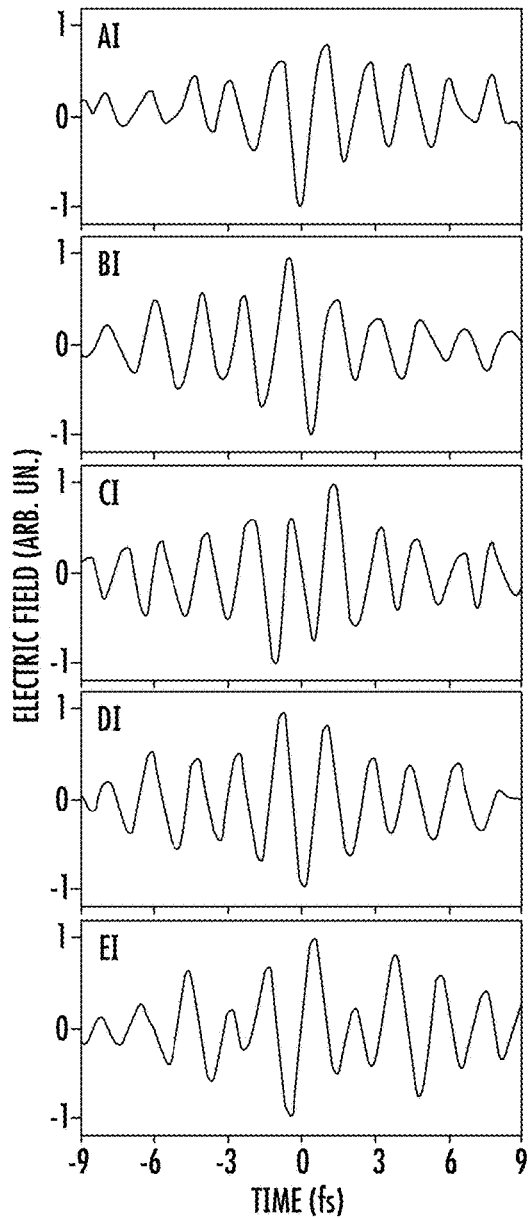
FIGS. 7 and 8 are plots illustrating implementations of attosecond electron motion control and an optical switch in a dielectric material.

The measured complex waveforms of the input optical field 218 are shown in the graph panels of FIG. 7. The respectively corresponding instantaneous intensity profiles of these waveforms—shown in dashed lines of the plot panels of FIG. 8—represent the electronic response of the SiO$_2$ dielectric system (sample 214) triggered in real time by interaction of the waveforms with such dielectric system. The carrier density $n_{ex}(t)$ triggered in the sample material 214 with these measured synthesized waveforms are depicted in solid lines of graphs of FIG. 8.

Figure 8:
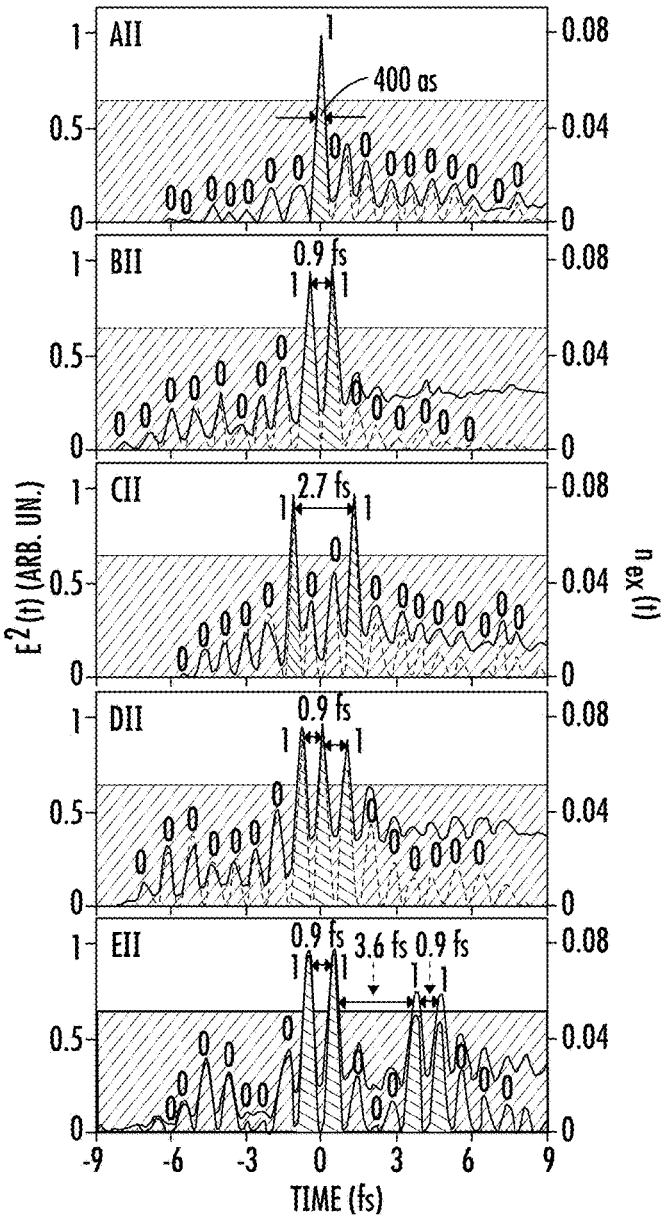

In one experiment, at an estimated field strength of IV/Å, the profile of the carrier density $n_{ex}(t)$ is following and substantially repeating profiles of the field intensity (E$^2$) while the number of triggered electrons is maximized at the crests of the field intensity profiles. For instance, using the optical attosecond pulse (shown in FIG. 7, panes AI, FIG. 8, panel AII) the electron triggering is maximized at the highest field crest (shaded area under the peak) that has a FWHM of about 400 attosecond, as shown with the solid line. In FIG. 8 panel BII, the maximization of the electron triggering signal (shaded areas under the peaks) occurs at two-time instants separated from one another by about 0.9 fs. It was experimentally shown that in practice such time-separation interval could be controlled to be 2.7 fs (as shown in panel CII of FIG. 8) with the use of a waveform of panel CI of FIG. 7.

Alternatively or in addition, the measured complex synthesized waveforms, of the input optical field 218, that are depicted in panels D1 and EI of FIG. 7 demonstrate the extensive control of electron motion in the sample 214. Utilizing the waveforms DI, EI of FIG. 7, the maximization of the electron carrier density in the target material sample was shown to be formed at three moments of time (see shaded areas under the peaks of panel DII of FIG. 8) separated from one another by 0.9 fs. In the plots EII of FIG. 8, the electrons' highest triggered signal was generated four times (as illustrated by the shaded areas under the peaks). The four signals (four peaks of the plots in panel EII) are separated in time such that a first pair of signals (separated from each other by 0.9 fs) precedes by 3.6 fs another pair of signals (which are also separated from one another by 0.9 fs).

It is now understood that the judiciously generated optical waveforms can be used to induce and control current signals with attosecond duration (see AII in FIG. 9)—in electronic circuitry that includes the target sample material 214 (equipped, in this case, with electrically-conducting members or electrodes that are appropriately electrically cooperated with the remaining portion of electronic circuitry EC). The current, voltage, or some other electrical parameter associated with the modulation of the dielectric constant of the target sample 214 with the use of the drive optical field 210 may be read, in this case, off of such electrodes. Setting additionally a certain current signal threshold (as illustrated by the shaded blue area in FIG. 8) in such electronic circuitry would allow switching "on" or "off" the light-induced current on the femtosecond or even attosecond time scale and, therefore establishing the ultrafast optical switches. The development of ultrafast electronics increases the data processing speed and information encoding to rates that exceed one petabit per second, a million times faster than the current technology. To this end, FIG. 8 additionally illustrates binary coding signals that can be optionally generated with the use of the synthesized waveforms in such a dielectric-target-sample-containing electronic circuitry EC by setting a predetermined threshold level to register only specified peaks of the carrier density modulation generated in the target sample by the drive field.

Figure 10:
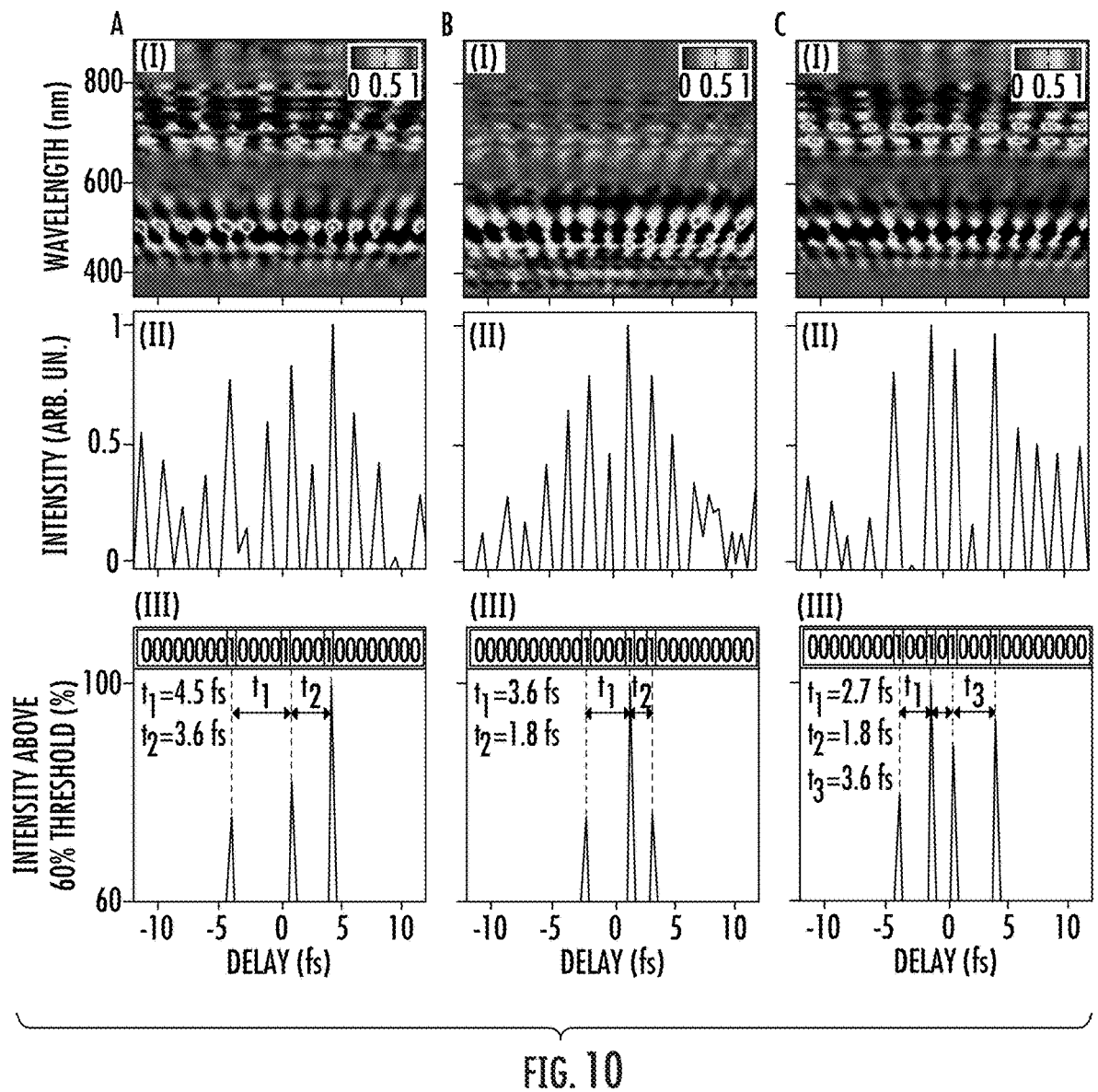
FIG. 10 provide example of ultrafast light field encoding and includes three panels (a, b, and c), each of which contains three plots (I, II, and III). Here, plots at a (I), b (I), c (I) illustrate measured spectrograms of the reflected probe beam triggered by three different synthesized waveforms after subtracting the probe spectrum in the absence of the pump field. Plots a(II), b(II), c(II) present the positive value of the probe spectra integrations as a function of time, representing the measured light signal by a photodetector in real-time, after subtracting the background. The light signal switches ON/OFF alternatively every half-cycle. Plots a(III), b(III), c(III) show the detected light signals above a 60% threshold. The light signals are switched ON and OFF at different time intervals. In the insets, the slots presenting the signal detection status in real-time as follows: black (0) means no signal detected above the threshold, while white (1) means the signal is above the threshold and seen by the detector. This optical switching signal control enables the binary data encoding on light fields with petahertz speed.

In a related implementation—and now referring to FIG. 10—panels a (I), b (I), and c (I) show some of the measured reflectivity modulation spectrograms—after subtracting background spectrum—triggered by three different synthesized light fields. The integrated intensities of the reflected spectra at different instances of time (above zero amplitude) are plotted in FIG. 10 panels a(II), b(II), and c(II). Note, the light signal can also be measured by photodiode detector instead of the spectrometer to directly detect the integrated intensity signal. The light signal switches from ON to OFF states uniformly every half-cycle of the driver field. By setting a certain intensity amplitude threshold (60%) in FIG. 18 panels a(II), b(II), and c(II)—which easily can be experimentally implemented or programmed in the photodetector—the number of the detected light signals (above this threshold) and the switching alternative-time varies depending on the shape of the driver waveform. FIG. 10 panels a(III), b(III), and c(III) show the signals above the 60% threshold, and the insets in the top (contains 22 slots) represent the signal status (OFF or ON) in black and white in real-time at each half cycle of the driver field. Using the first waveform, the signal switches ON and OFF three times with a time separation of 4.5 fs and 3.6 fs. This switching time interval is controlled to be 3.6 and 1.8 fs (as shown in FIG. 10 panel b(II)) using the second waveform. Moreover, the number of the switching signal increases to four by using the third waveform with 1.8, 1.8, and 3.6 fs time period separations between the signals as shown in FIG. 10 panel c(III).

Remarkably, this capability of controlling the light signal switching (ON/OFF) allows the ultrafast data encoding with synthesized light waveforms, which are beyond the reach of conventional ultrafast pulses field. Accordingly, the optical signal (reflected, in implementation of the apparatus of FIG. 2) above the pre-determined threshold will be detected "ON status" and presents the binary code "1". The reflected signal below the threshold—will not be detected by the photodetector and hence will have an "OFF status"—representing the binary code "0". The number of coding bits that the light field can carry equals twice of the number of the driver light field cycles. Some of the examples of binary encoding using the synthesized waveforms are shown in the insets of FIG. 10 panels a(III), b(III), and c(III). Remarkably, the presented experiments are conducted in ambient conditions at room temperature which promises viable engineering of the demonstrated light field encoding to stabilize the long-anticipated ultrafast photonics.

Figure 3A:
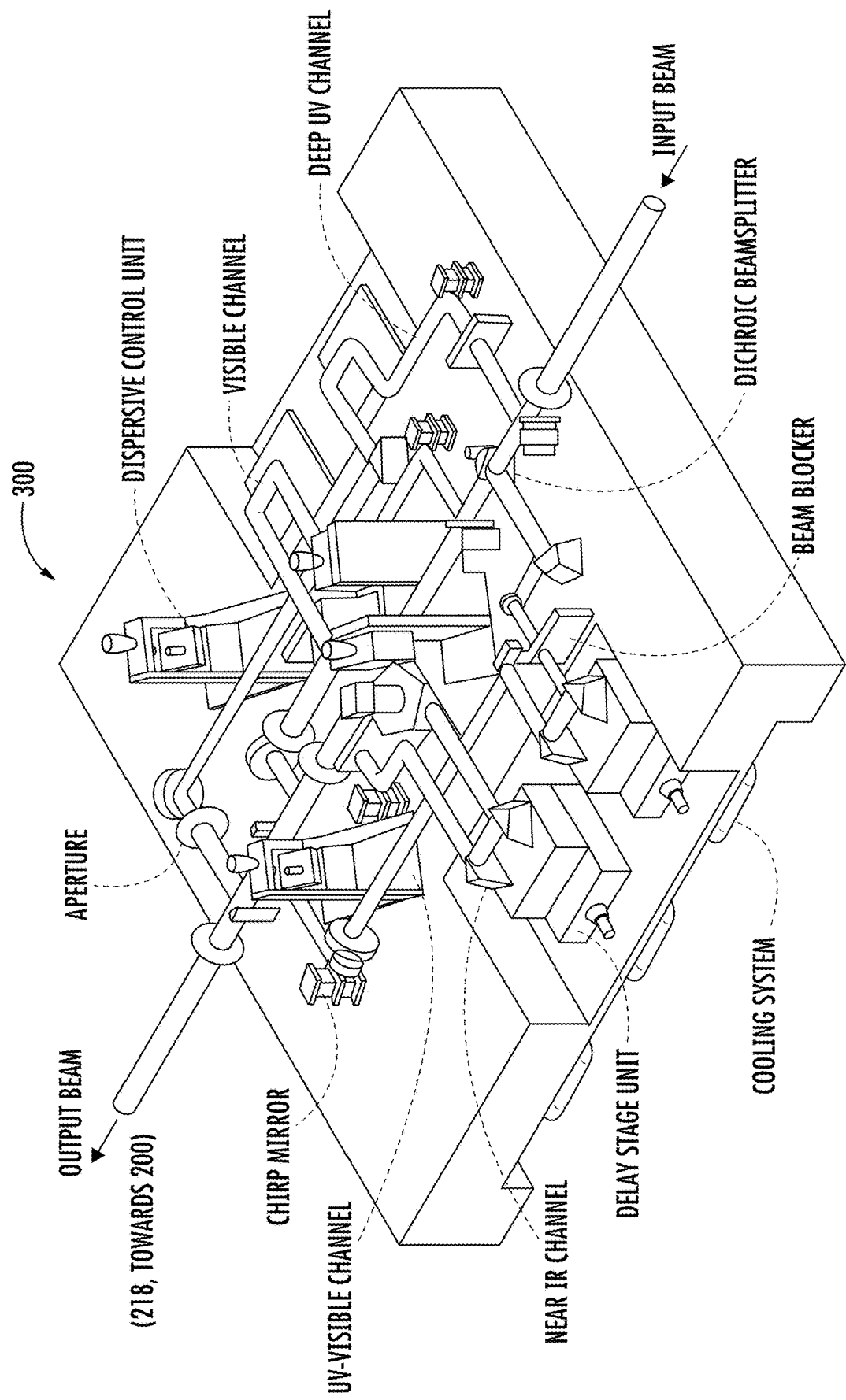
FIG. 3A: Illustration of an Attosecond Light Field Synthesizer (ALFS) apparatus that includes four channels.
Figure 11:
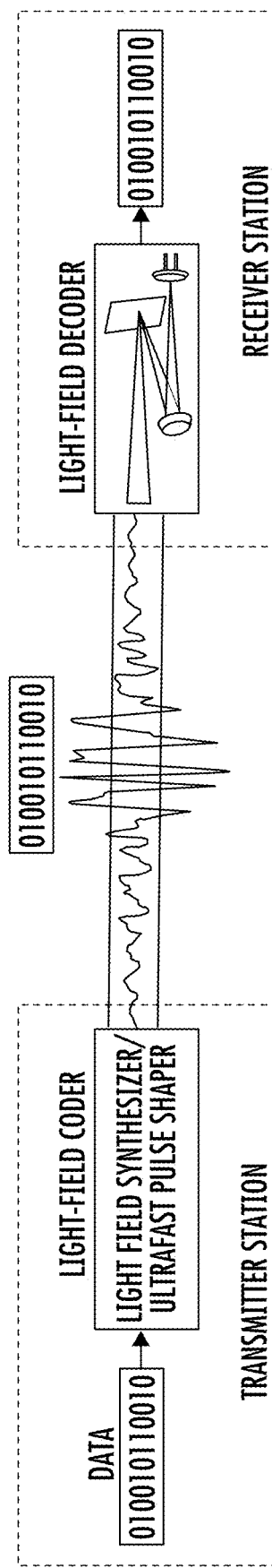
FIG. 11 is a schematic of an embodiment of a potential ultrafast light field encoding process exploiting optical switching with synthesized waveforms (with the use of the apparatus of FIG. 2).

A schematic depiction of an ultrafast light field encoding process configured according to the idea of the invention is illustrated in FIG. 11. Here, data may be encoded on the synthesized light waveforms generated by a laser source producing femto- or sub-femtosecond pulses (such as the ALFS of FIG. 3A) (or any appropriate pulse shaping device), which will act as an "encoder" device. Then, the synthesized waveform (which is considered to be the encoded laser beam) will carry the data from the transmitter to the receiver station. Next, the encoded laser beam will be focused on the dielectric together with another beam (decoder laser beam). Finally, the reflected decoder laser beam from the dielectric will be detected by a photodetector. After setting a certain predefined threshold, the photodetector will read the coded data in the 1 & 0 binary form. The light field encoding can be obtained using multicycle pulses, which are provided by the commercial laser systems available in the market, in combination with pulse shaping and light field synthesis technology. Notably, this demonstrated optical switching occurs in ambient conditions allowing a simple realistic architecture of a potentially realistic compact optical switch integrated on a photonic chip. Moreover, the data encoding on ultrafast light waveforms, in contrast to the encoding provided by modern electronic sources using a microwave, would significantly enhance the data processing and transformation speed for light-time distances.

Overall, with the use of an apparatus configured to real-time sampling of optical field on attosecond scale and determination of attosecond electronic delay response in a target non-electrically-conducting material, and with the use of synthesized optical waveforms a full control of electron motion in the target material was demonstrated and used to develop the optical switches and the attosecond photonics, paving the way to extend the frontiers of modern electronics and data information processing technologies into the petahertz realm.

Supplementary Information (A) Specific Embodiment(s) of a Source of Light Configured to Generate Input Beam 218.

While the description of such source of light (interchangeably referred to as a light filed synthesizer apparatus, or ALFS, or ALFS apparatus) can be found in, for example, M. T. Hassan, D. Hui, and H. Alqattan, in *APL Photonics,* 7, 041301 (2022)

Figure 3B:
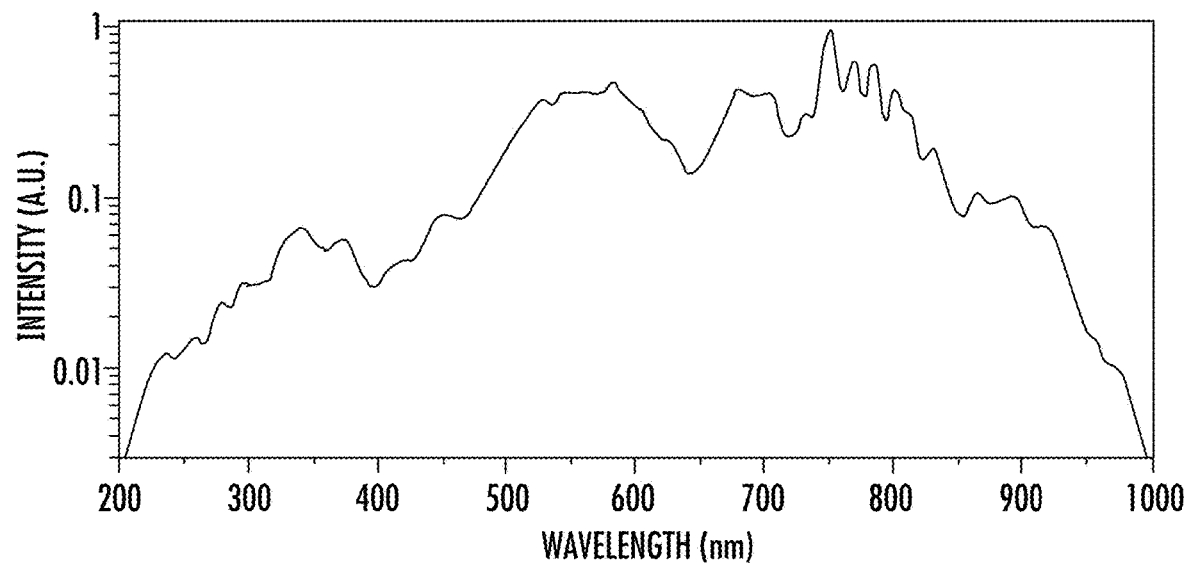
FIG. 3B: Supercontinuum light generation spanning over more than two octaves.
Figure 3C:
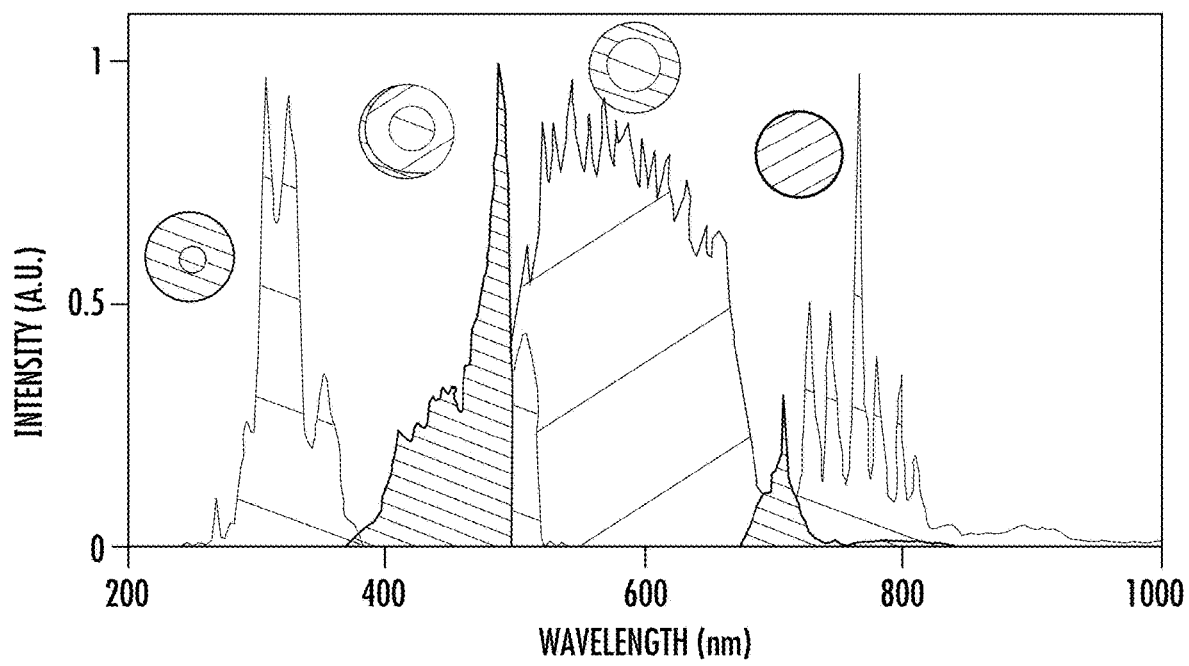
FIG. 3C: Normalized spectra of the four channels of the LFS apparatus: the near-IR spectral channel ($Ch_{NIR}$) from 700 to 1000 nm, the visible spectral channel ($Ch_{VIS}$) from 500 nm to 700 nm, the visible and ultra-violet spectral ($Ch_{VIS-UV}$) from 350 nm- to 500 nm, and the deep ultra-violet spectral channel ($Ch_{DUV}$) from 250 nm to 350 nm.

An attosecond light field synthesizer apparatus or ALFS (shown schematically as 300 in FIG. 3A) included several (four, as shown) spectral channels and was configured to tailor the light field in attosecond resolution for a broadband spectrum that spans over two octaves (250-1000 nm). The broadband supercontinuum was generated based on the nonlinear propagation of the multi-cycle laser pulses generated from an OPCPA-based laser system (repetition rate=10 KHz), carried at central wavelength ~790 nm, at 0.5 mJ, in a gas-filled hollow-core fiber. The output beam spectrum, extended over >2 octaves from 200-1000 nm, is shown in FIG. 3B. Inside the ALFS, the supercontinuum is spatially divided into four constituent channels with nearly equal bandwidth, utilizing dichroic beam splitters. Each channel spanned over approximately 0.5-octave (FIG. 3C), as follows; $Ch_{NIR}$ spanned over the near-IR spectral region (700-1000 nm), $Ch_{VIS}$ spanned over the visible spectral region (500-700 nm), $Ch_{VIS-UV}$ spanned over the part of the visible and ultraviolet spectral region (350-500 nm), and $Ch_{DUV}$ spanned over the deep ultraviolet spectral region (250-350 nm). The pulses of the constituent channels of the synthesizer were temporally compressed with the use of six dispersive (chirped) mirrors.

Inside the ALFS apparatus, a translation unit/device was implemented that carried a pair of mirrors in the path of each constituent channel to adjust the relative phases between the respective optical fields. The translation device included, at least in one case, a manually adjustable and piezoelectric translational stages used to control the relative phase delay between the ALFS channels with the attosecond precision. Additionally, two neutral density filters were implemented in the beam paths of $Ch_{VIS}$ and $Ch_{NIR}$ channels to control the relative intensities between the four spectral channels. These constituent channel pulses are spatio-temporally superimposed—with the same type of beamsplitters—to generate synthesized waveforms at the exit of the LFS apparatus. The control and stabilization of the relative phases and intensities of light in the four channels enable the field synthesis of complex waveforms with attosecond resolution.

In one case, the relative powers of light in the four channels were set as follows: $Ch_{DUV}$=25 mW, $Ch_{VIS-UV}$=50 mW, $Ch_{VIS}$=200 mW, and $Ch_{NIR}$=50 mW. The relative phases between different pulses of light produced by the LFS 900 were passively and actively stabilized. The LFS apparatus 900 was implemented on a quasi-monolithic supporting structure in which the mounts hosting the optical components were directly attached to cast-aluminum baseplate. The ALFS was passively thermostabilized with water cooling (at 19±0.05° C.) and enclosed in an aluminum housing that protected the optical setup against air fluctuations. Moreover, the ALFS was actively stabilized to compensate for any drifts in the optical paths among different channels. The active phase stabilization scheme was based on active phase locking as demonstrated in *Review of Scientific Instruments* 83, 111301, 2012. In this scheme, a computer program was used to analyze the (few nanometer) interference spectra of four channels, and accordingly adjusted the position of the piezoelectric translational stage in each channel to correct and stabilize their relative optical lengths in real time. The rms value for the phase stabilization between $Ch_{NIR}$ and $Ch_{VIS}$ was about 74 mrad, between $Ch_{VIS}$ and $Ch_{VIS-UV}$—about 68 mrad, and between $Ch_{VIS-UV}$ and $Ch_{DUV}$—about 33 mrad.

(B) Example of a Model Used to Calculate Modulation of Reflectivity of Target Sample 214 in Strong Optical Field Seven resonances were used in Eqs. 11 and 12 for each to model the multiple-resonance effect and temporal oscillation in FIG. 16A. The modeling parameters are listed in Table 1 and Table 2 for $\chi_2'$ and $\chi_1'$, respectively.

TABLE 1

Parameters for calculation of $\chi_2'$ (C = 0.9)

| Resonance | 1 | 2 | 3 | 4 | 5 | 6 | 7 |
|---|---|---|---|---|---|---|---|
| Photon energy (eV) | 3.49 | 3.02 | 2.50 | 2.18 | 1.94 | 1.64 | 1.38 |
| Photon number | 3 | 4 | 4 | 5 | 5 | 6 | 7 |
| MPI energy (eV) | 10.47 | 12.08 | 10.00 | 10.90 | 9.70 | 9.84 | 9.66 |
| $f_i$ | 0.0227 | 0.0102 | 0.0079 | 0.0027 | 0.0023 | 0.0034 | 0.0018 |
| $\Gamma_i$ (×10$^{14}$ s$^{-1}$) | 4.0 | 4.0 | 2.5 | 2.0 | 2.0 | 2.0 | 2.0 |

TABLE 2

Parameters for calculation of $\chi_1'$

| Resonance | 1 | 2 | 3 | 4 | 5 | 6 | 7 |
|---|---|---|---|---|---|---|---|
| Photon energy (eV) | 3.49 | 2.88 | 2.50 | 2.18 | 1.94 | 1.64 | 1.38 |
| Photon number | 3 | 4 | 4 | 5 | 5 | 6 | 7 |
| MPI energy (eV) | 10.47 | 11.52 | 10.00 | 10.90 | 9.70 | 9.84 | 9.66 |
| $f_k$ (×10$^{-4}$) | 5.48 | 3.99 | 3.99 | 2.49 | 1.99 | 1.99 | 1.20 |
| $\Gamma_k$ (×10$^{14}$ s$^{-1}$) | 4.0 | 4.0 | 2.5 | 2.0 | 2.0 | 2.0 | 2.0 |

Results reflected in FIG. 16A suggest that the asymmetry in reflectivity oscillation across the spectrum very likely originates from the phase drift of each frequency component of the pump pulse. This is because Eq. 12 is the only term in Eq. 11 that can introduce an oscillation to the reflectivity, and Eq. 11 is associated with the phase of each monochromatic wave that comprises the ultrashort pump pulse.

The disclosure of each and every of publications and/or patent documents referred to in this application is incorporated herein by reference.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes. Other specific examples of the meaning of the terms "substantially", "about", and/or "approximately" as applied to different practical situations may have been provided elsewhere in this disclosure. The term "element A and/or element B" conventionally refers to "at least one of element A and element B".

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

While the invention is described through the above-described specific non-limiting embodiments, it will be understood by those of ordinary skill in the art that modifications to, and variations of, the illustrated embodiments may be made without departing from the inventive concepts disclosed herein. The disclosed aspects may be combined in ways not listed above. Accordingly, the invention should not be viewed as being limited to the disclosed embodiment(s).

What is claimed is:

1. An apparatus, comprising:
    an illumination system having an input configured to receive an input beam of light carrying input light pulses and having an input spatial distribution of light, the illumination system being structured
    to reconfigure said input spatial distribution into a drive spatial distribution of light and a probe spatial distribution of light, said drive and probe spatial distributions of light being spatially-distinct from and coherent with one another, and
    to direct said drive and probe spatial distributions of light towards a predetermined location to spatially overlap at and interact with a medium present at the predetermined spatial location;
    a light-collecting optical system comprising at least an optical detection system that is disposed to receive only light from the probe spatial distribution of light that has interacted with the medium and to produce an image representing variation of an optical parameter of the medium caused by interaction of the medium with the drive spatial distribution of light, and
    a programmable electronic circuitry system that is operably cooperated with a tangible non-transitory storage medium containing program code thereon, wherein the program code, when loaded to the programmable electronic circuitry, enables the electronic circuitry
        (1a) to acquire an output from the light-collecting optical system, said output representing a time-dependent variation of the optical parameter of the medium to being irradiated with the drive spatial distribution of light only when the medium is also being substantially simultaneously irradiated with the probe spatial distribution of light;
    and
        (1b) to generate indicia of acquisition of at least one of (i) an electrical signal from the medium when the electrical signal exceeds a pre-determined electrical signal threshold and (ii) an optical field when intensity of optical field in the drive spatial distribution of light exceeds a pre-determined optical signal threshold.

2. The apparatus according to claim 1, further comprising a source of light configured to generate said input beam carrying said input light pulses having a femtosecond duration or a sub-femtosecond duration.

3. The apparatus according to claim 1, wherein:
    (3a) the light-collecting system includes at least one of a lens and a reflector, and
    an optical detector;
and/or
    (3b) the illumination system includes
    at least one of a refractive optical component and an optical reflector, and
    a time-delay relay that is juxtaposed to said first optical system and connected to the electronic circuitry and that is configured to introduce a phase delay between a drive optical field of the drive spatial distribution of light and a probe optical field of the probe spatial distribution of light;
and/or
    (3c) the medium at the predetermined spatial location includes a target substantially non-electrically-conducting material carrying first and second electrodes thereon.

4. The apparatus according to claim 3, wherein—when the medium at the predetermined spatial location includes said target material carrying the first and second electrodes thereon—the programmable electronic circuitry is configured to acquire an electrical signal, from said first and second electrodes, representing an electrical response of the target material to being irradiated with the drive spatial distribution of light only when the target material is also being substantially simultaneously irradiated with the probe spatial distribution of light.

5. The apparatus according to claim 1, wherein the programmable electronic circuitry is additionally configured to vary a parameter of the optical field in the drive spatial distribution of light such as to change at least a time delay between occurrences of generation of said indicia in a predetermined fashion.

6. The apparatus according to claim 1, wherein the program code is configured to govern the electronic circuitry to perform at least the following actions:
    to operate a time-delay relay juxtaposed with said illumination system to vary a phase delay between the drive optical field and the probe optical field;
    to define the optical signal threshold to be registered with the light-collecting system, wherein the optical signal threshold is defined such that the light-collecting system generates an indicia of a registered optical signal only when an intensity of an optical field of the probe spatial distribution of light acquired at the light-collecting system exceeds said optical signal threshold.

7. The apparatus according claim 1, wherein the light-collecting optical system includes at least one of an optical polarizer component and a spatial filter disposed to block light from the drive distribution of light from entering a field of view of an optical detection system of the light-collecting system.

8. The apparatus according to claim 1, wherein the light-collecting optical system is configured to acquire light only from the probe spatial distribution of light in reflection from the medium.

9. The apparatus according to claim 1, wherein the illumination system includes at least one of the following: a) at least one curved optical reflector, and b) an optically-opaque screen with first and second apertures.

10. The apparatus according to claim 1, wherein said optical parameter is at least one of optical transmissivity and optical reflectivity.

11. A method comprising:
receiving the input beam of light at the input of the apparatus according to claim 1;
irradiating a target substantially non-electrically-conducting material, disposed at the pre-determined spatial location, with a first pulse of a drive optical field formed from the input beam of light and containing oscillations occurring on a femtosecond time scale or a sub-femtosecond time-scale;
illuminating said target material with the second pulse of a probe optical field produced from the input beam of light;
performing, with said programmable electronic circuitry system:
(11a) acquiring at least one electrical signal, from the target material, that represents an electrical response of the target material to interaction with the drive optical field,
wherein said at least one electrical signal is generated only when said illuminating and said irradiating occur simultaneously;
and/or
(11b) with an optical detector of the light-collecting system, acquiring light of the probe beam that has interacted with the target material to identify a temporal profile of the drive optical field,
wherein said temporal profile of the drive optical field is identified only when said illumination and said irradiating occur simultaneously;
and
further comprising generating indicia of at least one of the following: (i) the at least one electrical signal from the target material when the electrical signal exceeds a pre-determined electrical signal threshold and (ii) the drive optical field when intensity of the probe beam acquired at the optical detector exceeds a pre-determined optical signal threshold.

12. The method according to claim 11, comprising
(12a) interpreting an occurrence of said indicia as one of "0" and "1" of a binary number system; and/or
(12b) interpreting a time-delay between neighboring occurrences of said indicia as the other of "0" and "1" of the binary number system.

13. The method according to claim 11, wherein said generating indicia of the at least one electrical signal includes generating an indicia signal in which a time delay between occurrences of said indicia is interpreted by the programmable circuitry of the apparatus as one of "0" and "1" of a binary number system and in which a peak registered above the electrical signal threshold is interpreted as the other of "0" and "1" of the binary number system.

14. The method according to claim 11, further comprising:
(14a) modifying the drive optical field to have said at least one electrical signal include multiple peaks, at least first and second peaks from said multiple peaks of the at least one electrical signal exceeding the electrical signal threshold; and
reconfiguring the drive optical field such as to vary a time delay between the first peak and the second peak;
and/or
(14b) modifying the drive optical field to have irradiance of the drive optical field include multiple peaks, at least first and second peaks of said multiple peaks of the irradiance of the drive optical field exceeding the pre-determined optical signal threshold, and
reconfiguring the drive optical field such as to vary a time delay between the first and second peaks of said multiple peaks of irradiance.

15. The method according to claim 11, wherein, when the target material is configured to carry and/or contain electrodes on opposing sides thereof, the method further comprises:
with the use of the electrodes, measuring variation of an electrical parameter caused at the target material at least by said irradiating the target material with the first pulse of the drive optical field.

16. A method according to claim 11, comprising transforming the drive optical field to have irradiance of the drive optical field contain at least first and second peaks above a predetermined threshold of irradiance.

17. A method according to claim 16,
wherein the method is configured to satisfy at least one of the following conditions:
(17a) the method further comprises varying a time delay between the first and second peaks;
and
(17b) wherein a ratio of a first duration, of a chosen peak of the first and second peaks of the irradiance of the drive optical field, to a second duration of said time delay is equal to a pre-determined value, and
wherein the method further comprises recording a binary code, based at least on an output from an optical detector of the light-collecting system, in which said time delay is interpreted as one of "0 and "1" from a binary number system and in which a peak registered above the predetermined threshold of irradiance is interpreted as the other of "0" and "1" of the binary number system.

18. A method according to claim 11,
wherein said at least one electrical signal is received from electrodes carried by a target material located at the predetermined spatial location, and
further comprising transforming the drive optical field to have said at least one electrical signal from the target material contains at least first and second peaks above a pre-determined threshold of electrical signal.

19. A method according to claim 18, configured to satisfy at least one of the following conditions:
(19a) the method further comprises varying a time delay between the first and second peaks of the electrical signal;

and
- (19b) wherein a ratio of a first duration, of a chosen peak of the first and second peaks of the electrical signal, to a second duration of said time delay is equal to a pre-determined value, and wherein the method further comprises recording a binary code, based at least on an output from the programmable electronic circuitry, in which said time delay between the first and second peaks of the electrical signal is interpreted as one of "0 and "1" from a binary number system and in which a peak registered above the pre-determined threshold of electrical signal is interpreted as the other of "0" and "1" of the binary number system.

20. The method according to claim 11, devoid of using a second harmonic of the drive optical field and/or a third harmonic of the drive optical field and/or using a phase-retrieval algorithm.

21. The method according to claim 11, wherein, when said indicia does not represent an envelope of an oscillating function.

22. A method comprising:
by changing a mode of operation of a laser source, modifying—on a femtosecond time scale or a sub-femtosecond time scale—a drive optical field, delivered from the laser source to a target sample, to have irradiance including multiple peaks;
acquiring, with an optical detection system, light from a probe optical field in reflection from or in transmission through the target sample, wherein the probe optical field and the drive optical field are substantially coherent with one another,
and
performing at least one of the following:
- (22a) interpreting an occurrence when an irradiance of light from the probe optical field acquired at the optical detection system exceeds a pre-determined optical signal threshold as one of "0" and "1" of a binary number system; and
- (22b) while reconfiguring the drive optical field such as to vary a time delay between the first and second peaks of said multiple peaks of irradiance, interpreting a time delay between a consecutive occurrence when the irradiance of light from the probe optical field exceeds the pre-determined optical signal threshold as the other of "0" and "1" of the binary number system;

wherein a ratio of a first duration, of a chosen peak of the first and second peaks of the irradiance of the drive optical field, to a second duration of said time delay is equal to a pre-determined value.

23. A method comprising:
receiving the input beam of light at the input of the apparatus according to claim 1;
irradiating a target substantially non-electrically-conducting material, disposed at the pre-determined spatial location, with a first pulse of a drive optical field formed from the input beam of light and containing oscillations occurring on a femtosecond time scale or a sub-femtosecond time-scale
while, at the same time, illuminating said target material with the second pulse of a probe optical field produced from the input beam of light;
performing, with said programmable electronic circuitry system:
- (i) acquiring at least one electrical signal, from the target material, that represents an electrical response of the target material to interaction with the drive optical field, and/or
- (ii) with an optical detector of the light-collecting system, acquiring light of the probe beam that has interacted with the target material to identify a temporal profile of the drive optical field, and
further comprising generating indicia of at least one of the following: (i) the at least one electrical signal from the target material when the electrical signal exceeds a pre-determined electrical signal threshold and (ii) the drive optical field when intensity of the probe optical field of the probe beam acquired at the optical detector exceeds a pre-determined optical signal threshold.

24. A method comprising:
generating an input beam of light with an attosecond light synthesizer (AFLS);
with the use of the apparatus according to claim 1:
irradiating a target substantially non-electrically-conducting material, disposed at the pre-determined spatial location, with a first pulse of a drive optical field formed from the input beam of light and containing oscillations occurring on a femtosecond time scale or a sub-femtosecond time-scale;
illuminating said target material with the second pulse of a probe optical field, which is substantially coherent with the drive optical field, substantially simultaneously with said irradiating;
and
with the use of the programmable electronic circuitry system of said apparatus:
- (i) generating first indicia of an electrical signal, which is received from electrodes at the target material and which represents an electrical response of the target material to the drive optical field, when the electrical signal exceeds a pre-determined electrical signal threshold;

and/or
- (ii) generating second indicia representing the drive optical field when intensity of the probe optical field acquired at an optical detector of the light-collecting system of the apparatus exceeds a pre-determined optical signal threshold.

* * * * *